(12) United States Patent
Lu et al.

(10) Patent No.: US 11,019,365 B2
(45) Date of Patent: May 25, 2021

(54) METHODS AND SYSTEMS FOR IMAGE COMPRESSION

(71) Applicant: ZHEJIANG DAHUA TECHNOLOGY CO., LTD., Hangzhou (CN)

(72) Inventors: Jingang Lu, Hangzhou (CN); Weigang Chen, Hangzhou (CN); Weizhong Yao, Hangzhou (CN); Xingming Zhang, Hangzhou (CN); Yinchang Yang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 193 days.

(21) Appl. No.: 15/747,589

(22) PCT Filed: Jul. 29, 2016

(86) PCT No.: PCT/CN2016/092427
§ 371 (c)(1),
(2) Date: Jan. 25, 2018

(87) PCT Pub. No.: WO2017/016526
PCT Pub. Date: Feb. 2, 2017

(65) Prior Publication Data
US 2018/0220160 A1      Aug. 2, 2018

(30) Foreign Application Priority Data

Jul. 30, 2015  (CN) .......................... 201510458952.2
Dec. 8, 2015   (CN) .......................... 201510901947.4

(51) Int. Cl.
*H04N 19/103*       (2014.01)
*H04N 19/124*       (2014.01)
(Continued)

(52) U.S. Cl.
CPC ......... *H04N 19/625* (2014.11); *H04N 19/103* (2014.11); *H04N 19/117* (2014.11);
(Continued)

(58) Field of Classification Search
CPC .. H04N 19/103; H04N 19/117; H04N 19/119; H04N 19/124; H04N 19/132;
(Continued)

(56) References Cited

U.S. PATENT DOCUMENTS 4,974,078 A * 11/1990 Tsai ....................... H04N 9/045
                                                    348/E9.01
5,528,628 A    6/1996 Park et al.
(Continued)

FOREIGN PATENT DOCUMENTS

CN    101656889 A    2/2010
CN    101902650 A    12/2010
(Continued)

OTHER PUBLICATIONS

The extended European search report in European Application No. 16829891.7 dated Nov. 2, 2018, 17 pages.
(Continued)

*Primary Examiner* — Yubin Hung
(74) *Attorney, Agent, or Firm* — Metis IP LLC

(57) ABSTRACT

A method relating to image compression includes acquiring image data of an image, wherein the image includes a matrix of pixels, and the image data include pixel values of the matrix of pixels. The method also includes generating, based on the image data, a first-level data set including pixel values of a portion of the matrix of pixels. The method further includes determining at least one coding mode for the first-level data set, encoding the first-level data set into a code stream based on the at least one coding mode, and packaging the code stream into a modified code stream.

20 Claims, 20 Drawing Sheets

(51) Int. Cl.
| | |
|---|---|
| *H04N 19/174* | (2014.01) |
| *H04N 19/625* | (2014.01) |
| *H04N 19/186* | (2014.01) |
| *H04N 19/182* | (2014.01) |
| *H04N 19/149* | (2014.01) |
| *H04N 19/30* | (2014.01) |
| *H04N 19/117* | (2014.01) |
| *H04N 19/93* | (2014.01) |
| *H04N 19/132* | (2014.01) |
| *H04N 19/119* | (2014.01) |
| *H04N 19/91* | (2014.01) |
| *H04N 19/196* | (2014.01) |

(52) U.S. Cl.
CPC ......... *H04N 19/119* (2014.11); *H04N 19/124* (2014.11); *H04N 19/132* (2014.11); *H04N 19/149* (2014.11); *H04N 19/174* (2014.11); *H04N 19/182* (2014.11); *H04N 19/186* (2014.11); *H04N 19/196* (2014.11); *H04N 19/30* (2014.11); *H04N 19/91* (2014.11); *H04N 19/93* (2014.11)

(58) Field of Classification Search
CPC .. H04N 19/149; H04N 19/182; H04N 19/186; H04N 19/196; H04N 19/30; H04N 19/625; H04N 19/91; H04N 19/93; H04N 19/174
See application file for complete search history.

(56) References Cited

U.S. PATENT DOCUMENTS

| | | | |
|---|---|---|---|
| 5,774,594 A | 6/1998 | Kitamura | |
| 5,801,841 A | 9/1998 | Suzuki | |
| 6,212,301 B1* | 4/2001 | Warner | G06T 9/00 382/232 |
| 6,233,359 B1* | 5/2001 | Ratnakar | H04N 19/132 375/240.2 |
| 6,460,061 B1* | 10/2002 | Dick | G06F 17/147 708/400 |
| 6,501,851 B1* | 12/2002 | Kondo | G06T 9/005 382/162 |
| 6,798,837 B1 | 9/2004 | Uenoyama et al. | |
| 2001/0002937 A1* | 6/2001 | Warner | H04N 1/3333 382/232 |
| 2004/0071356 A1* | 4/2004 | Sudharsanan | H04N 19/60 382/244 |
| 2005/0013363 A1 | 1/2005 | Cho et al. | |
| 2005/0129320 A1* | 6/2005 | Koto | H04N 19/147 382/239 |
| 2005/0135478 A1* | 6/2005 | Van Der Schaar | H04N 19/187 375/240.12 |
| 2005/0265446 A1* | 12/2005 | Yankilevich | H04N 19/14 375/240.03 |
| 2006/0039579 A1 | 2/2006 | Mossakowski | |
| 2006/0215765 A1* | 9/2006 | Hwang | H04N 7/152 375/240.21 |
| 2006/0232452 A1 | 10/2006 | Cha | |
| 2007/0133892 A1* | 6/2007 | Chiba | H04N 19/61 382/239 |
| 2007/0195369 A1* | 8/2007 | McDowell | H04N 1/64 358/1.18 |
| 2007/0206867 A1 | 9/2007 | Tamura et al. | |
| 2009/0003714 A1 | 1/2009 | Subramaniam | |
| 2009/0027517 A1 | 1/2009 | Jerdev | |
| 2009/0245353 A1 | 10/2009 | Choi et al. | |
| 2010/0172593 A1 | 7/2010 | Chono | |
| 2010/0322597 A1* | 12/2010 | Gharavi-Alkhansari | H04N 19/176 386/328 |
| 2012/0147209 A1* | 6/2012 | Hiraoka | H04N 5/37455 348/222.1 |
| 2013/0176409 A1 | 7/2013 | Kotani et al. | |
| 2013/0188065 A1* | 7/2013 | Wegener | H04N 5/23206 348/207.99 |
| 2013/0251255 A1* | 9/2013 | Nakanishi | G06T 9/00 382/166 |
| 2014/0092998 A1* | 4/2014 | Zhu | H04N 9/64 375/240.29 |
| 2014/0301445 A1* | 10/2014 | Sasai | H04N 19/136 375/240.02 |
| 2016/0373613 A1* | 12/2016 | Kelly | H04N 9/64 |
| 2017/0208310 A1* | 7/2017 | Strom | H04N 9/643 |
| 2017/0272760 A1 | 9/2017 | Lai | |

FOREIGN PATENT DOCUMENTS

| | | |
|---|---|---|
| CN | 101986693 A | 3/2011 |
| CN | 103167289 A | 6/2013 |
| CN | 103227917 A | 7/2013 |
| JP | 2007202212 A | 8/2007 |

OTHER PUBLICATIONS

Hong-Yu Chao et al., High-performance Low-Complexity Bit-Plane Coding Scheme for MPEG-4 FGS, IEEE International Conference on Multimedia and EXPO, ISBN: 978-0-7803-9331-8, 89-92 (2005).
Henrique S. Malvar, Adaptive Run-Length/Golomb-Rice Encoding of Quantized Generalized Gaussian Sources with Unknown Statistics, Data Compression Conference, pp. 23-32 (2006).
JPEG—Wikipedia, the free encyclopedia, pp. 1-21 (2005).
Charilaos Christopoulos et al., The JPEG2000 still image coding system: An Overview, IEEE Transactions on Consumer Electronics, 46(4): 1103-1127 (2000).
Marcelo J. Weinberger et al., The LOCO-I Lossless Image Compression Algorithm: Principles and Standardization into JPEG-LS, IEEE Transactions on Image Processing, 9(8): 1309-1324 (2000).
International Search Report in PCT/CN2016/092427 dated Oct. 20, 2016, 5 pages.
Written Opinion in PCT/CN2016/092427 dated Oct. 20, 2016, 4 pages.
First Office Action in Chinese Application No. 201510901947.4 dated Feb. 1, 2018, 9 pages.
First Office Action in Chinese Application No. 201510458952.2 dated Dec. 27, 2018, 8 pages.

* cited by examiner

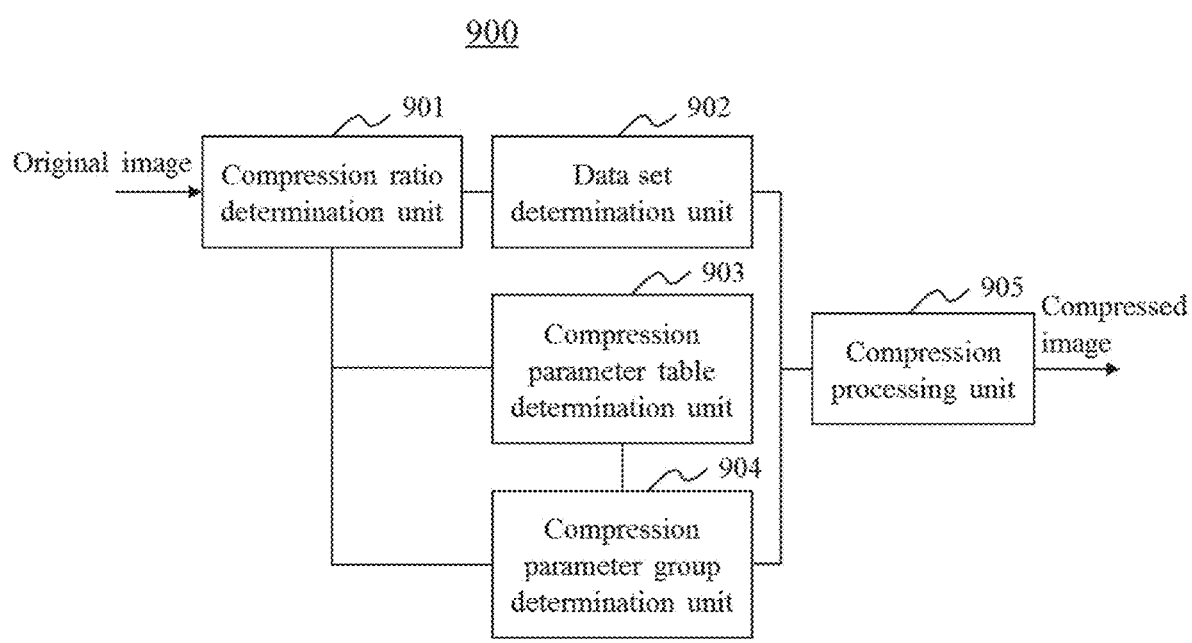
FIG. 9-A

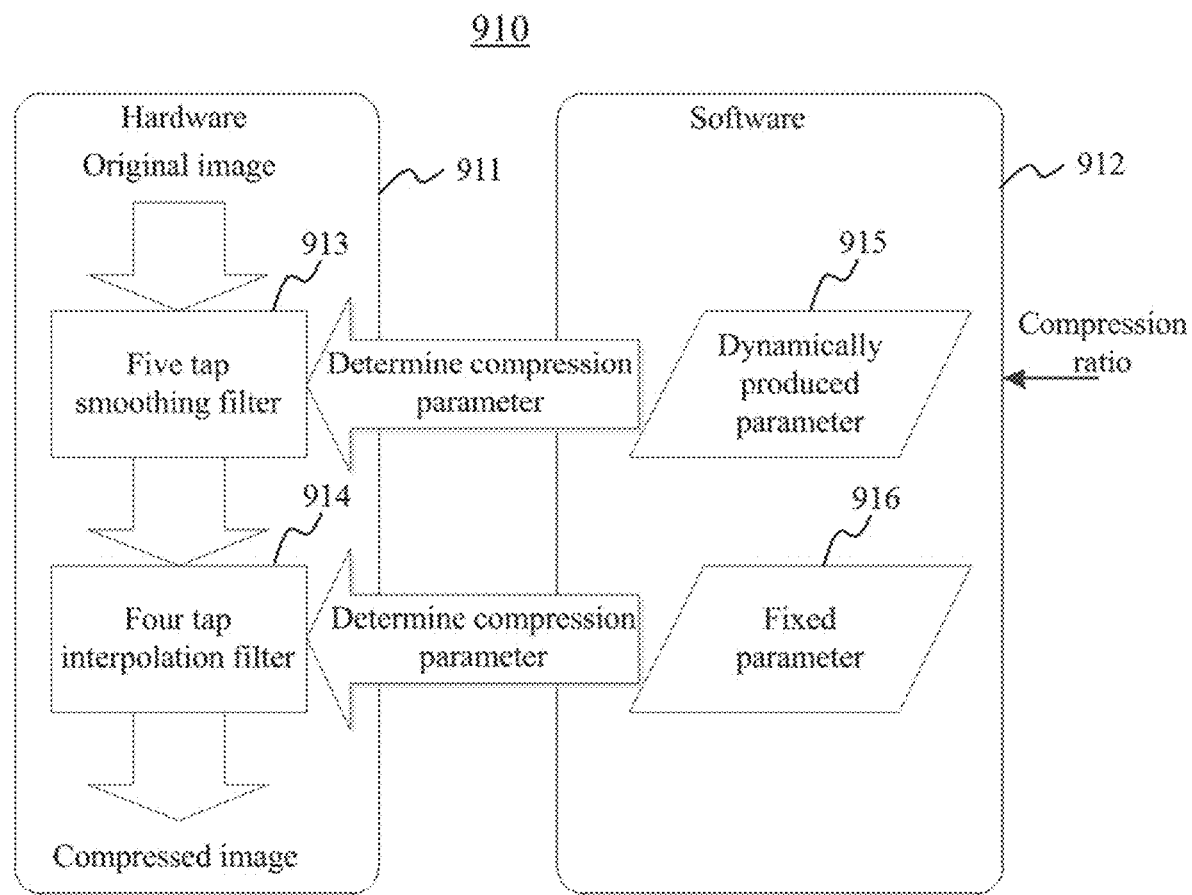
FIG. 9-B

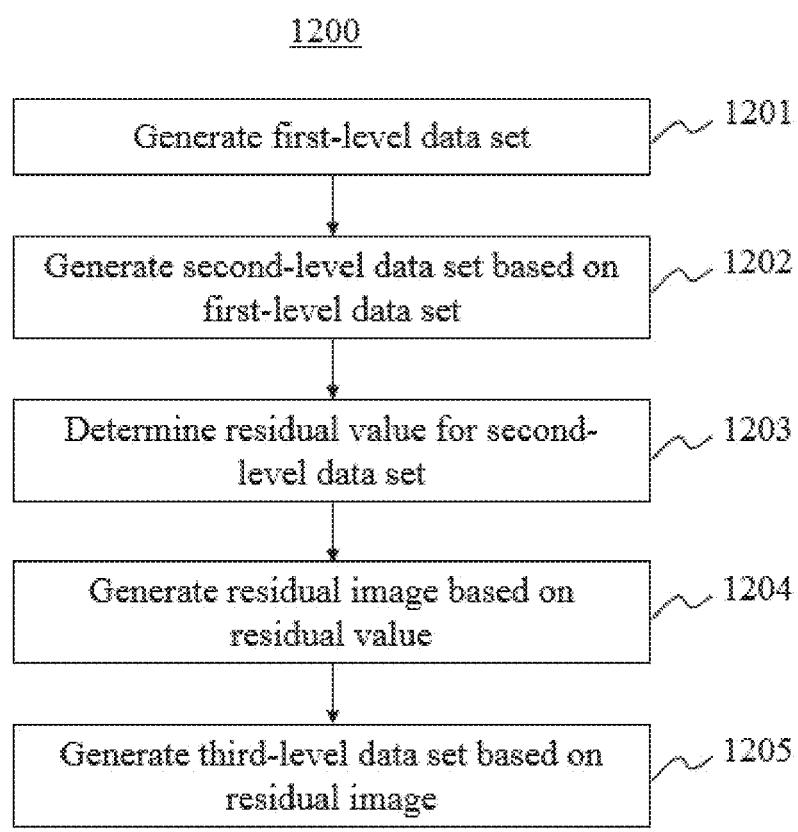
FIG. 12-A

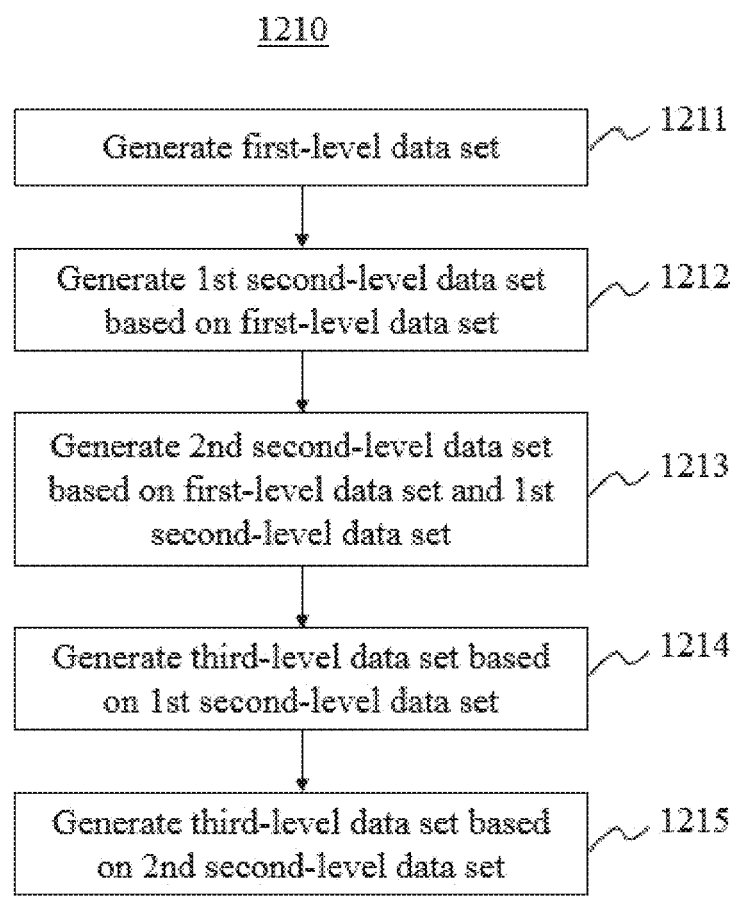
FIG. 12-B

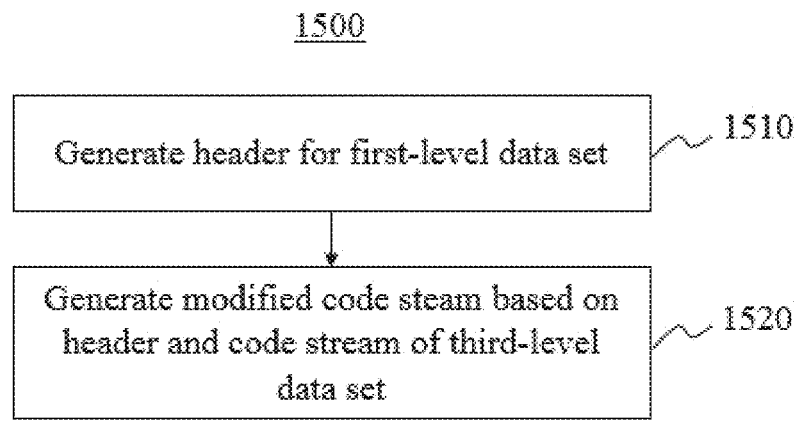
FIG. 15
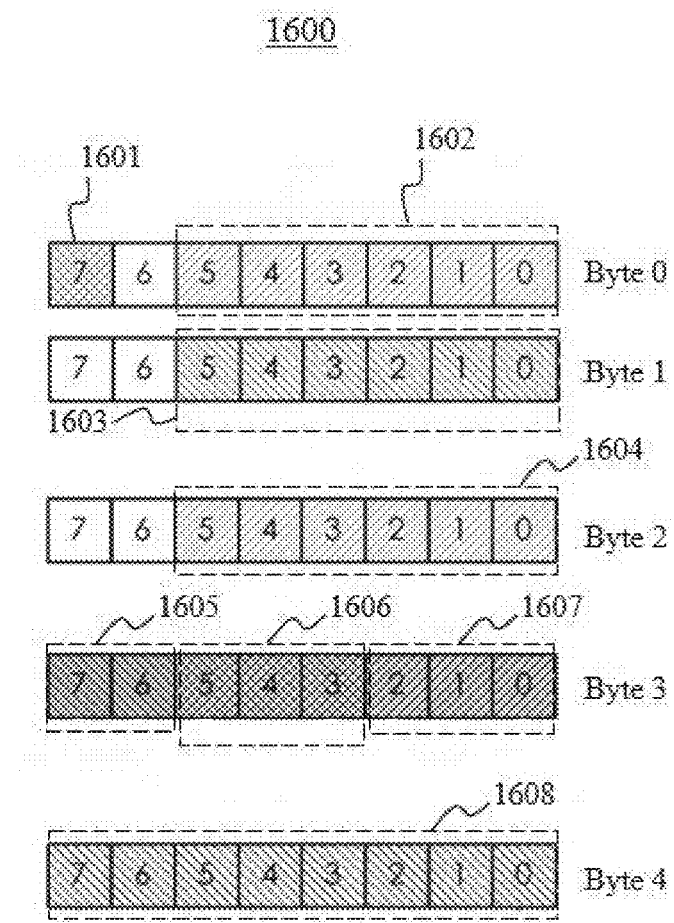
FIG. 16-A

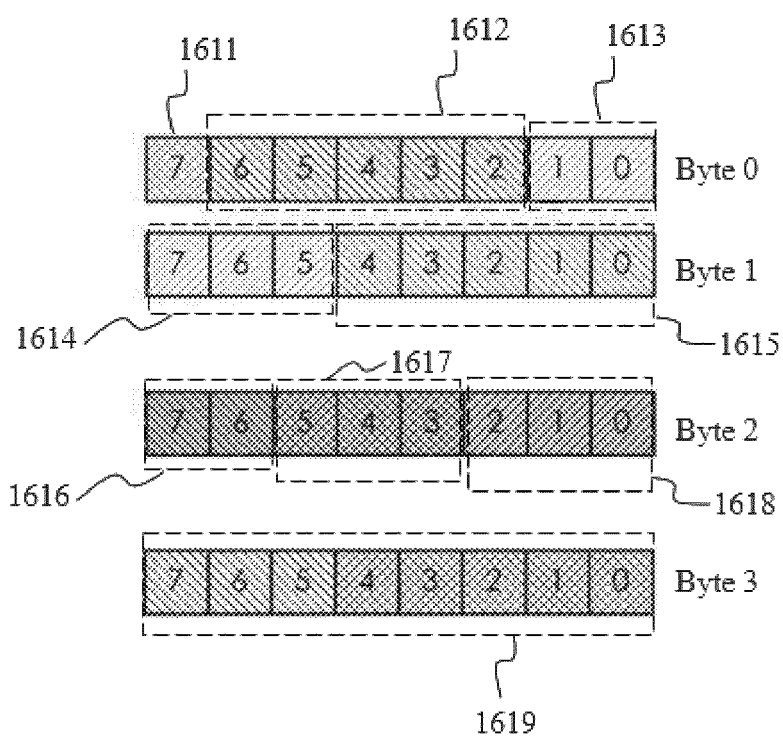
FIG. 16-B

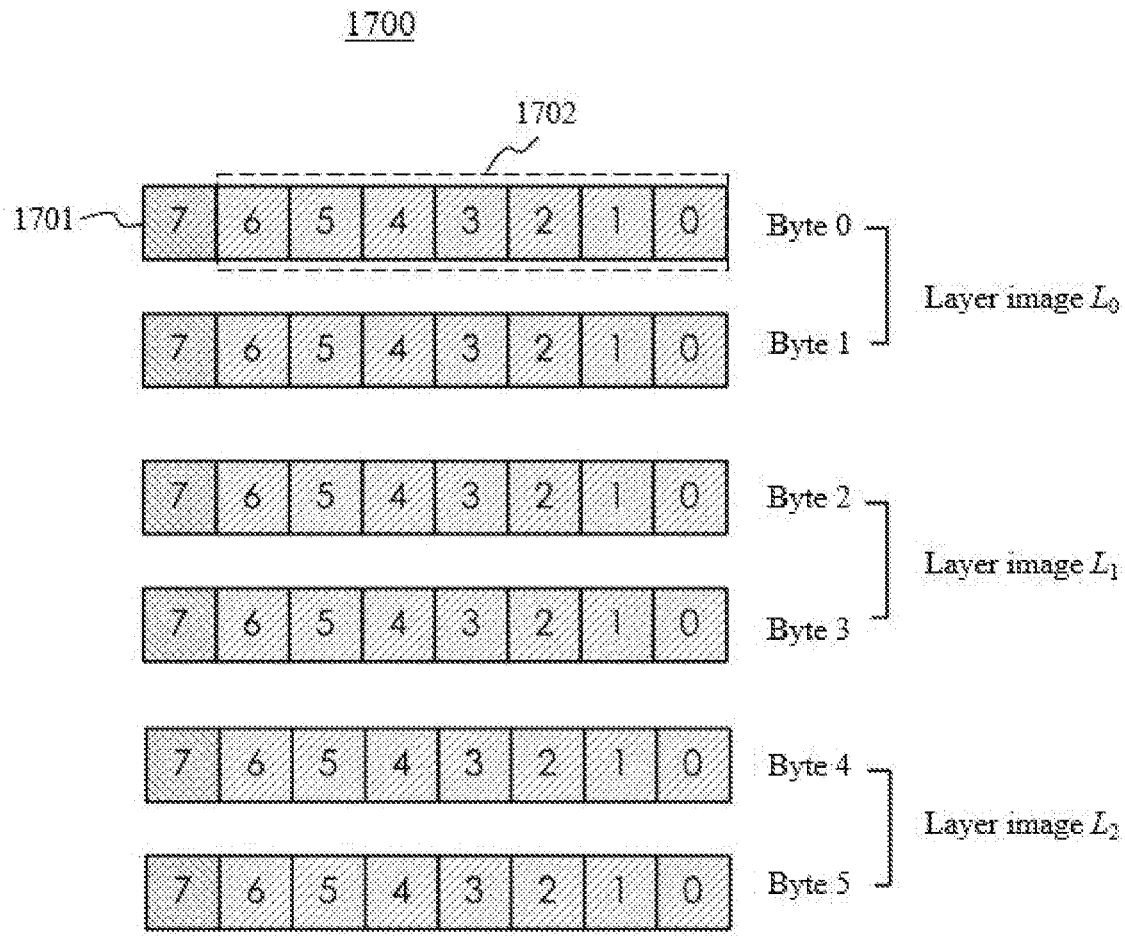
FIG. 17-A
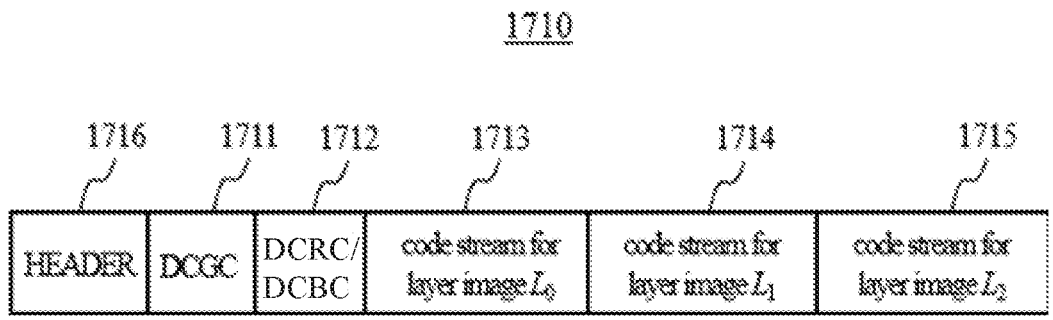
FIG. 17-B

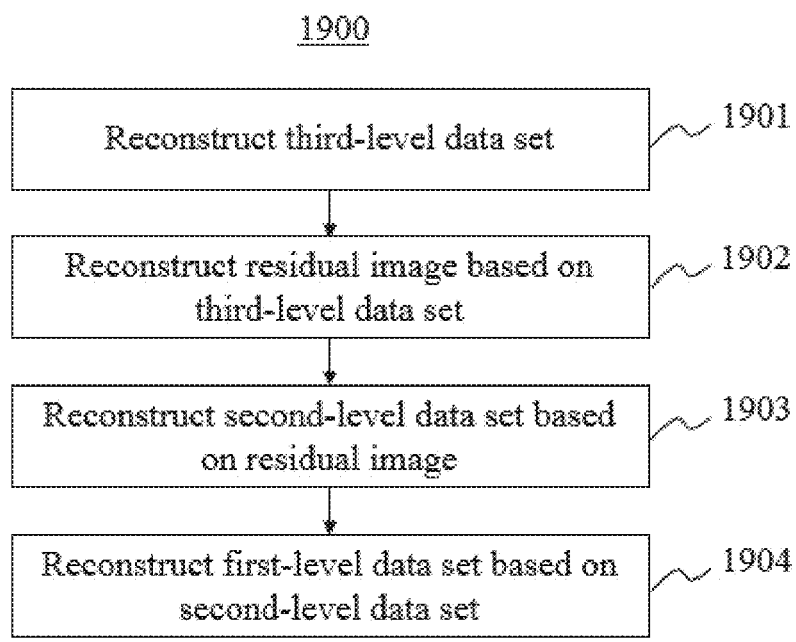
FIG. 19-A
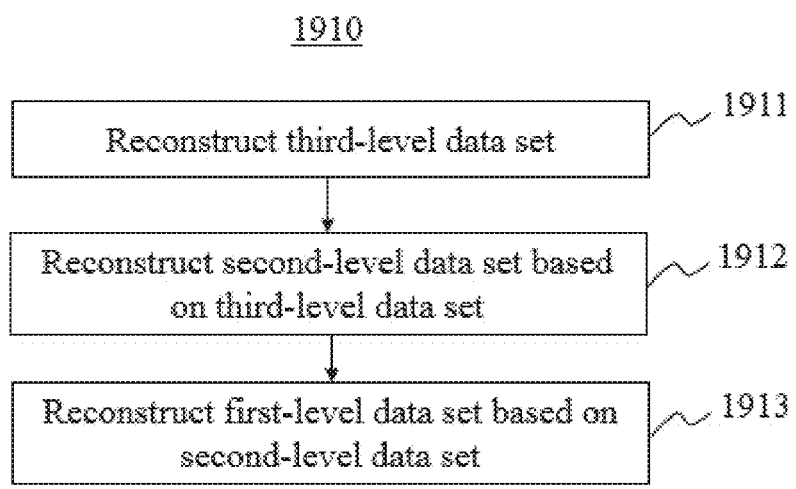
FIG. 19-B

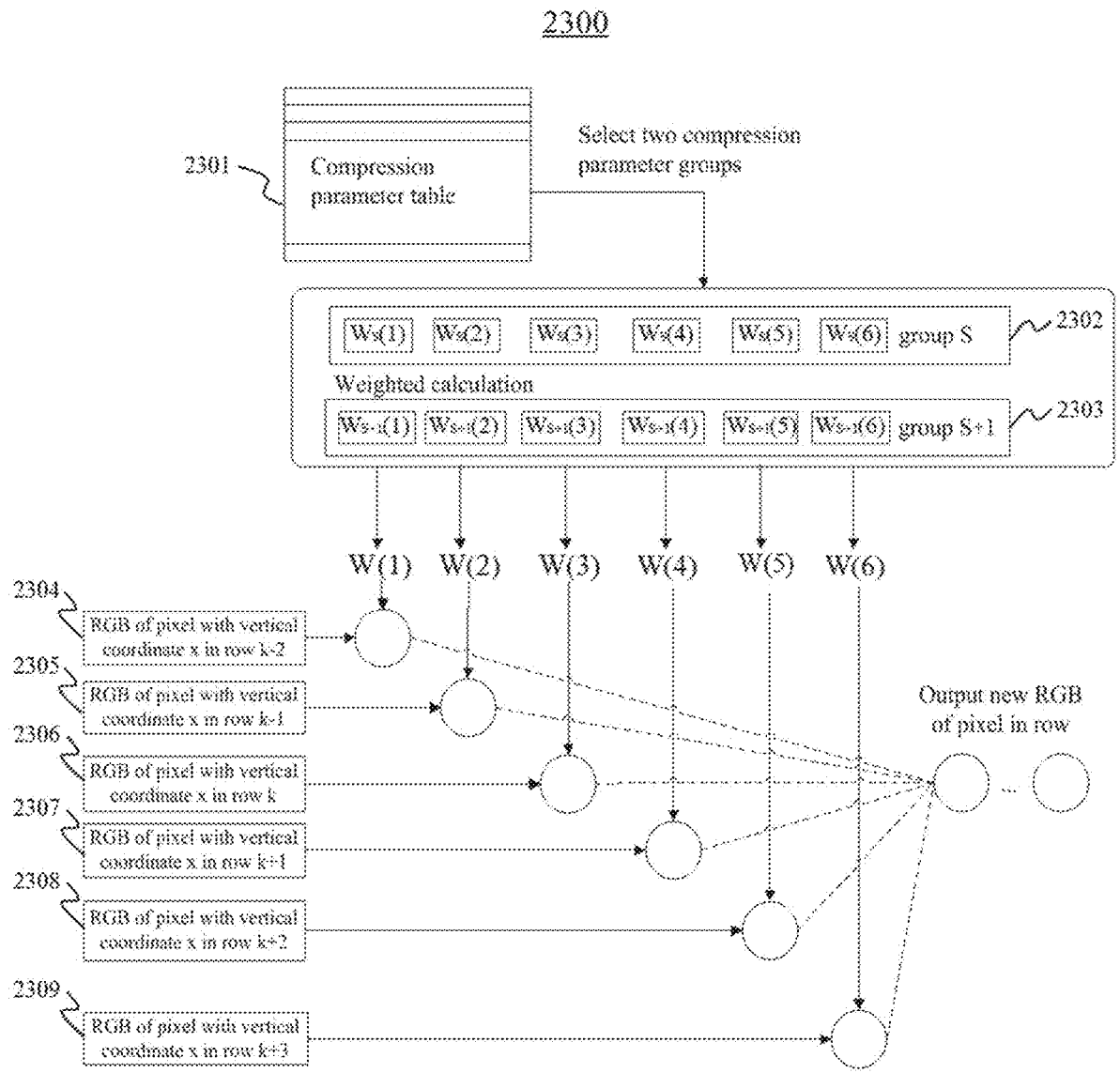
FIG. 23-A

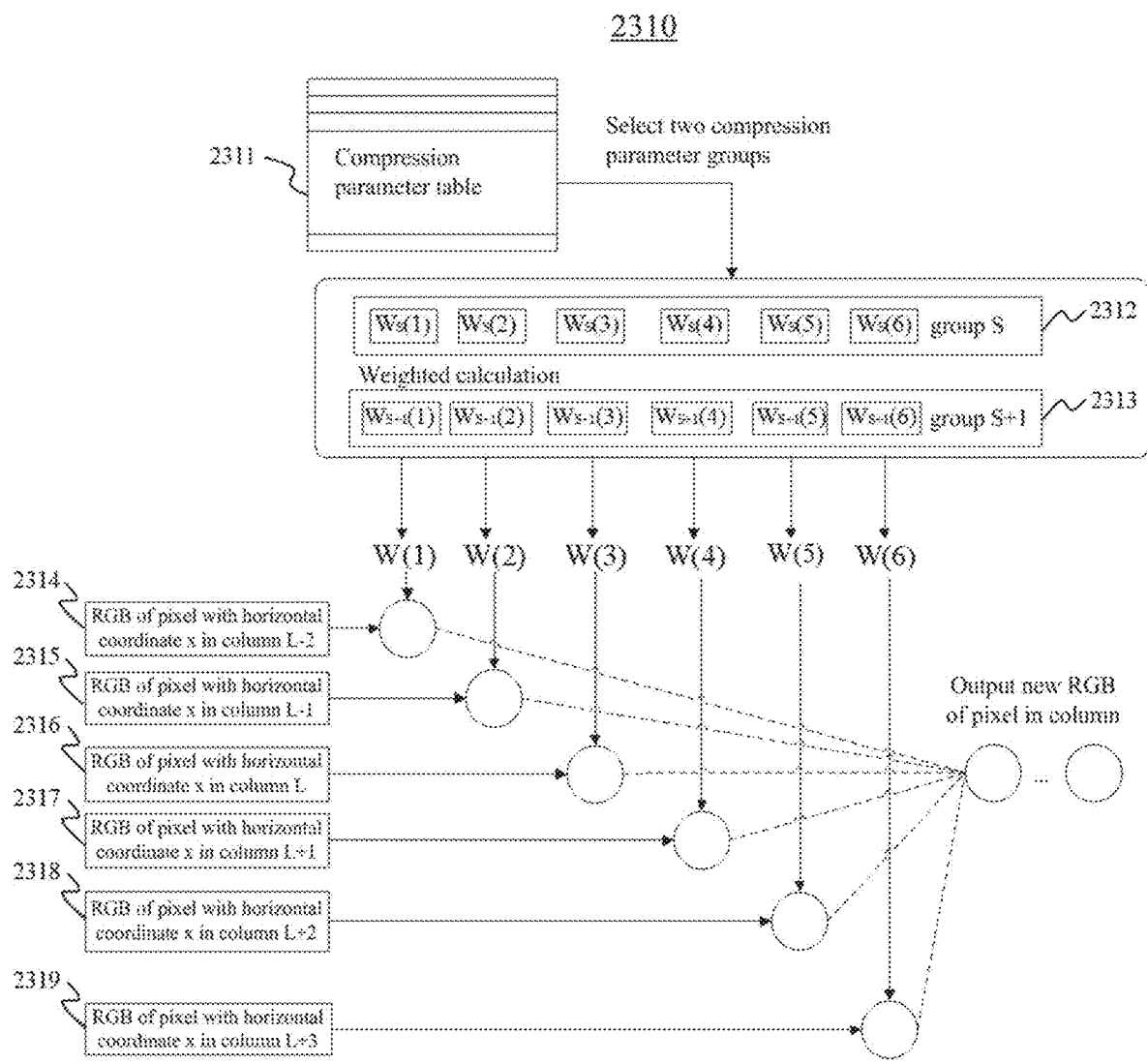
FIG. 23-B

METHODS AND SYSTEMS FOR IMAGE COMPRESSION

CROSS-REFERENCE TO RELATED APPLICATIONS

This application claims priority of Chinese Patent Application No. 201510458952.2, filed on Jul. 30, 2015, and Chinese Patent Application No. 201510901947.4, filed on Dec. 8, 2015. Each of the above-referenced applications is expressly incorporated herein by reference to their entireties.

TECHNICAL FIELD

The present disclosure generally relates to image compression, more specifically relates to methods and systems for encoding, decoding, and scaling an image or a video frame.

BACKGROUND

Image compression may have a significant impact on image storing, processing, displaying, and transmitting. Image compression may reduce irrelevance and redundancy of the image data. Image compression may include lossy and lossless image compression. Specifically, image compression may include image encoding and scaling. As image resolution and video sample rate improves with the development of technology, the amount of image data increases greatly, which may enhance bandwidth burden or power consumption in transmission process. Image encoding may be helpful in reducing data quantity, decreasing transmission bandwidth or pourer consumption, and reducing storage demands. Image decoding may be helpful in reconstructing the image data, and maintaining image quality. For example, when an image may be processed or transmitted between different devices, the image may be encoded and/or decoded. In some cases, image may have a higher or lower resolution than a display device, the image may be scaled to facilitate displaying. Image scaling may convert an image with an image matrix to an image having a different number of matrix points.

SUMMARY

One aspect of the present disclosure relates to a method for encoding an image. The method may include one or more of the following operations. Image data of an image may be acquired, wherein the image may include a matrix of pixels, and the image data may include pixel values of the matrix of pixels. A first-level data set may be generated based on the image data, wherein the first-level data set may include pixel values of a portion of the matrix of pixels. At least one coding mode may be determined for the first-level data set. The first-level data set may be encoded into a code stream based on the at least one coding mode. The code stream may be packaged into a modified code stream.

Another aspect of the present disclosure relates to a method for decoding an image. The method may include one or more of the following operations. A code stream of image data may be acquired. A plurality of sub-code streams may be generated based on the code stream. For a sub-code stream, a header may be identified based on the sub-code stream; the sub-code stream may be decoded based on the header; a plurality of third-level data sets may be reconstructed based on the decoded sub-code stream; a plurality of second-level data sets may be reconstructed based on the plurality of third-level data sets; a first-level data set may be reconstructed based on the plurality of second-level data sets. The image may be reconstructed based on the first-level data set.

Another aspect of the present disclosure relates to a method for scaling an image. The method may include one or more of the following operations. Image data may be acquired. A first compression factor may be determined for the image data. The image data may be partitioned into M data sets based on the first compression factor, wherein M may be an integer greater than 1. Compression parameters for the M data sets may be determined based on the first compression factor. The M data sets may be compressed based on the determined compression parameters.

Another aspect of the present disclosure relates to a non-transitory computer readable medium including executable instructions. The instructions, when executed by at least one processor, may cause the at least one processor to effectuate the method for encoding an image.

Another aspect of the present disclosure relates to a non-transitory computer readable medium including executable instructions. The instructions, when executed by at least one processor, may cause the at least one processor to effectuate the method for decoding an image.

Another aspect of the present disclosure relates to a non-transitory computer readable medium including executable instructions. The instructions, when executed by at least one processor, may cause the at least one processor to effectuate the method for scaling an image.

Another aspect of the present disclosure relates to a system for encoding an image. The system may include an image data acquisition engine configured to acquire image data of an image, wherein the image may include a matrix of pixels, and the image data may include pixel values of the matrix of pixels. The system may include a data set generation module configured to generate a first-level data set based on the image data, wherein the first-level data set may include pixel values of a portion of the matrix of pixels. The system may include a coding mode determination module configured to determine at least one coding mode for the first-level data set. The system may include a code stream generation module configured to encode the first-level data set into a code stream based on the at least one coding mode. The system may further include a packaging module configured to package the code stream into a modified code stream.

Another aspect of the present disclosure relates to a system for decoding an image. The system may include a code stream determination module configure to acquire a code stream of image data, and generate a plurality of sub-code streams based on the code stream. The system may include a header identification module configured to identify a header based on the sub-code stream. The system may include a decoding, module configured to decode the sub-code stream based on the header, reconstruct a plurality of third-level data sets based on the decoded sub-code stream, reconstruct a plurality of second-level data sets based on the plurality of third-level data sets, and reconstruct a first-level data set based on the plurality of second-level data sets. The system may further include an image reconstruction module configured to reconstruct the image based on the first-level data set.

A further aspect of the present disclosure relates to a system for scaling an image. The system may include an image data acquisition engine configured to acquire image data. The system may include a compression factor determination module configured to determine a first compression factor for the image data. The system may include a partition module configured to partition the image data into M data sets based on the first compression factor, wherein M may be an integer greater than 1. The system may include a compression parameter determination module configured to determine compression parameters for the M data sets based on the first compression factor. The system may further include a compressing module configured to compress the M data sets based on the determined compression parameters.

In some embodiments, the image may be a color filter array (CFA) image with a CFA pattern, and a pixel value of a pixel in the image may include a red chroma component, a green chroma component, or a blue chroma component.

In some embodiments, the image may be a video frame having a sampling format, and a pixel value of a pixel in the image may include a luma component, a blue-difference chroma component, and a red-difference chroma component.

In some embodiments, the generation of the first-level data set may include one or more of the following operations. A plurality of pixel values of a portion of the pixels in the image may be extracted based on the sampling format of the video frame. The first-level data set may be generated based on the plurality of pixel values.

In some embodiments, the generation of the first-level data set may include one or more of the following operations. A plurality of pixel values of a row of pixels may be obtained from the image. The first-level data set may be generated based on the plurality of pixel values, wherein the first-level data set may include green components of the plurality of pixel values, and red/blue components of the plurality of pixel values.

In some embodiments, the method for encoding an image may further include one or more of the following operations. A second-level data set Y may be generated based on the first-level data set, wherein the second-level data set Y may include luma components of a plurality of pixel values of the first-level data set. A second-level data set Cb may be generated based on the first-level data set, wherein the second-level data set Cb may include blue-difference chroma components of a plurality of pixel values of the first-level data set. A second-level data set Cr may be generated based on the first-level data set, wherein the second-level data set Cr may include red-difference chroma components of a plurality of pixel values of the first-level data set.

In some embodiments, the method for encoding an image may further include one or more of the following operations. N third-level data sets may be generated based on the second-level data sets Y, Cb, Cr, wherein N may be a first integer, and the first integer may be greater than 1.

In some embodiments, the generation of the N third-level data sets may include one or more of the following operations. A first residual value set may be obtained by calculating the residual values of data in the second-level data set Y. A second residual value set may be obtained by calculating the residual values of data in the second-level data set Cb. A third residual value set may be obtained by calculating the residual values of data in the second-level data set Cr. A residual image may be generated based on the first residual value set, the second residual value set, and the third residual value set. The residual image may be partitioned into N third-level data sets.

In some embodiments, partition of the residual image into N third-level data sets may include one or more of the following operations. Each pixel value of the residual image may be partitioned into N portions, wherein each portion may include one or more bits. Each third-level data set may be generated by extracting a portion of the N portions of the each pixel value.

In some embodiments, partition of the each pixel value of the residual image into N portions may include one or more of the following operations. The each pixel value of the residual image may be mapped into a non-negative integer within a range. The non-negative integer may be transformed into a binary number with a same number of bit. The binary number may be divided into N portions.

In some embodiments, the method for encoding an image may further include one or more of the following operations. A plurality of transformation coefficients may be generated by performing a two-dimensional discrete cosine transform (2D DCT) process and a quantization process for the first-level data set. A first second-level data set may be generated based on the plurality of transformation coefficients.

In some embodiments, the method for encoding an image may further include one or more of the following operations. A second second-level data set may be generated based on the first second-level data set and the first-level data set, wherein the second second-level data set may include residual values of a plurality of data in the first-level data set.

In some embodiments, the generation of the second second-level data set may include one or more of the following operations. A reconstruction data set may be generated by performing an inverse quantization process and an inverse 2D DCT process of the first second-level data set. The residual values of the plurality of data in the first-level data set may be calculated based on the first-level data set and the reconstruction data set. The second second-level data set may be generated based on the residual values of the plurality of data in the first-level data.

In some embodiments, the method for encoding an image may further include one or more of the following operations. The first second-level data set may be partitioned into N1 third-level data sets, wherein N1 may be a second integer, and the second integer may be greater than 1. The second second-level data set may be partitioned into N2 third-level data sets, wherein N2 may be a third integer, and the third integer may be greater than 1.

In some embodiments, partition of the first second-level data set into N1 third-level data sets may include one or more of the following operations. Each pixel value of the first second-level data may be partitioned into N1 portions, wherein each portion of the N1 portions may include one or more bits. Each third-level data set may be generated by extracting a portion of the N1 portions of the each pixel value.

In some embodiments, partition of the second second-level data set into N2 third-level data sets may include one or more of the following operations. Each pixel value of the second second-level data may be partitioned into N2 portions, wherein each portion of the N2 portions may include one or more bits. Each third-level data set may be generated by extracting a portion of the N2 portions of the each pixel value.

In some embodiments, the determination of at least one coding mode may include one or more of the following operations. For a third-level data set, lengths of code streams of the third-level data set may be predicted with candidate coding modes including Huffman coding, run-length coding, fixed-length coding, or order-k exponential Golomb coding; the predicted lengths may be compared; a coding mode may be selected based on a result of the comparison.

In some embodiments, the determination of the at least one coding mode may further include one or more of the following operations. For a third-level data set, an original length of the code stream of the third-level data set without coding may be calculated; the predicted lengths may be compared with the original length; whether to encode the third-level data set may be determined based on a result of the comparison.

In some embodiments, the determination of whether to encode the third-level data set may include one or more of the following operations. It may be determined to encode the third-level data set using the coding mode with the shortest length of the predicted lengths, if the predicted lengths are less than the original length. It may be determined not to encode the third-level data set, if any length of predicted lengths is not less than the original length.

In some embodiments, the method for encoding an image may further include one or more of the following operations. A header may be generated, wherein the header may include information regarding the at least one coding mode, a length of the plurality of code streams, or whether the plurality of code streams are encoded or not. The header may be packaged into the modified code stream.

In some embodiments, the method for scaling an image may further include one or more of the following operations. A second compression factor may be determined.

In some embodiments, the method for scaling an image may further include one or more of the following operations. The image data may be partitioned into a plurality of data sets based on the first compression factor and the second compression factor.

In some embodiments, the first compression factor may be a compression ratio.

In some embodiments, the second compression factor may be a number of taps of a filter.

In some embodiments, the determination of compression parameters for the M data sets may include one or more of the following operations. For a data set of the M data sets, a candidate compression parameter table may be determined; a target compression parameter table may be determined based on the candidate compression parameter table, wherein the target compression parameter table may include a plurality of compression parameter groups; a target compression parameter group may be determined based on the first compression factor and the target compression parameter table, wherein the target compression parameter group may include a plurality of compression parameters.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9-A is a schematic diagram illustrating an exemplary image scaling apparatus according to some embodiments of the present disclosure;

FIG. 9-B is a schematic diagram illustrating hardware and software components of an exemplary image scaling apparatus according to some embodiments of the present disclosure;

FIG. 12-A is a flowchart of an exemplary process for generating a data set according to some embodiments of the present disclosure;

FIG. 12-B is a flowchart of an exemplary process for generating a data set according to some embodiments of the present disclosure;

FIG. 15 is a flowchart of an exemplary process for packaging a code stream according to some embodiments of the present disclosure;

FIG. 16-A is a schematic diagram illustrating an exemplary header for a YCbCr 4:2:0 image according to some embodiments of the present disclosure;

FIG. 16-B is a schematic diagram illustrating an exemplary header for a YCbCr 4:2:2 image according to some embodiments of the present disclosure;

FIG. 17-A is a schematic diagram illustrating an exemplary header for a Bayer color filter array image according to some embodiments of the present disclosure;

FIG. 17-B is a schematic diagram illustrating an exemplary packaged code stream for a Bayer color filter array image according to some embodiments of the present disclosure;

FIG. 19-A is a flowchart of an exemplary process for reconstructing image data according to some embodiments of the present disclosure;

FIG. 19-B is a flowchart of an exemplary process for reconstructing image data according to some embodiments of the present disclosure;

FIG. 23-A is a schematic diagram illustrating an exemplary method for scaling an image along the horizontal direction according to some embodiments of the present disclosure; and FIG. 23-B is a schematic diagram illustrating an exemplary method for scaling an image along the vertical direction according to some embodiments of the present disclosure.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "module," and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

For illustration purposes, the following description is provided to help better understanding an image compression method or system. It should be noted that "image" may refer to a static picture, or a video frame. It is understood that this is not intended to limit the scope the present disclosure. For persons having ordinary skills in the art, a certain amount of variations, changes and/or modifications may be deducted under guidance of the present disclosure. Those variations, changes and/or modifications do not depart from the scope of the present disclosure.

Figure 1:
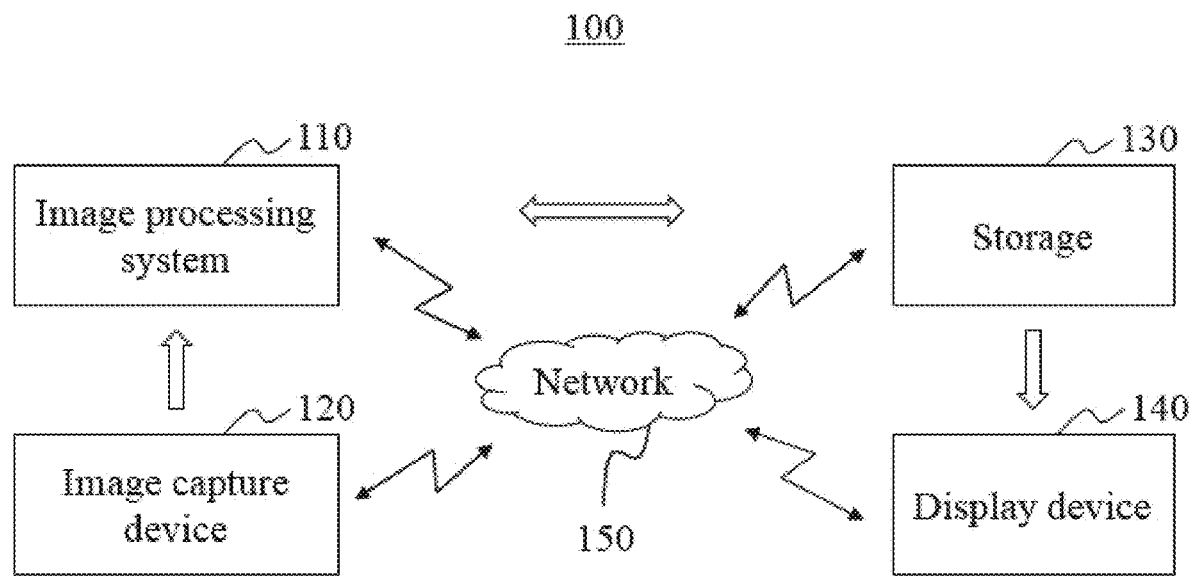
FIG. 1 is a schematic diagram illustrating an exemplary application of an exemplary image processing system according to some embodiments of the present disclosure.

Referring FIG. 1, the application may be used in various fields including, for example, a security technology, a transportation management, a prison system, a communication industry, an energy field, a medical treatment, an education system, a financial service, or the like, or any combination thereof.

Image processing system 110 may be configured to process image data Image processing system 110 may be deposited in a digital camera. In some embodiments, image processing system 110 may include one or more processors to perform processing operations disclosed in this disclosure. The processor(s) may include a microcontroller, a microprocessor, a reduced instruction set computer (RISC), an application specific integrated circuits (ASICs), an application-specific instruction-set processor (A SIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), or any circuit or processor capable of executing one or more functions, or the like, or any combinations thereof.

In some embodiments, image processing system 110 may also include a memory configured to store data and/or instructions. In some embodiments, the memory may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the memory may be configured to store one or more programs and/or instructions that may be executed by the processor(s) of image processing system 110 to perform exemplary methods described in the this disclosure. For example, the memory may be configured to store program(s) and/or instruction(s) executed by the processor(s) of image processing system 110 to encode image data, decode image data, and/or scale an image. For example, a ROM may store a coding mode (e.g., Huffman coding) for image processing system 110 to encode data.

In some embodiments, the image data may be obtained from an image, for example, a still image or a video frame of a video. The image may include a digital image, an optical image, or an analog image, or the like, or any combination thereof. The digital image may include a raster image, a bitmapped image, a vector image, or any other image represented by numeric, or the like, or any combination thereof. In some embodiments, image processing system 110 may communicate with other devices, such as image capture device 120, storage 130, or external devices via network 150.

Image capture device 120 may be configured to capture an image. The image may include a plurality of image data. Merely by way for example, image capture device 120 may include a digital camera configured to capture a still image or a video. The digital camera may refer to a 2D camera, a 3D camera, a panoramic camera, a VR camera, a web camera, an instant picture camera, or the like, or any combination thereof. The digital camera may be mounted in a medical imaging equipment, a night vision equipment, a radar system, a sonar system, an electronic eye, a camcorder, a thermal imaging device, a smartphone, a tablet PC, a laptop, a wearable device (e.g., a 3D glasses), an eye of a robot, or the like, or any combination thereof. The digital camera may include an optical sensor, a radio detector, an artificial retina, a mirror, a telescopes, a microscope, or the like, or any combination thereof. For example, the digital camera may include a card digital camera, a manual camera, an auto focus camera, a telephoto camera, a wide field camera, a single lens reflex (SLR) camera, a digital single lens reflex (DSLR) camera, or the like, or any combination thereof.

In some embodiments, image capture device 120 may include one or more imaging sensors. The imaging sensor may detect and/or convey information of an image. The imaging sensor may include an analog imaging sensor and/or a digital imaging sensor. The imaging sensor may contain a video camera tube, a vacuum tube, a semiconductor charge-coupled devices (CCD) or an active pixel sensor (e.g., a complementary metal-oxide-semiconductor (CMOS) or a N-type metal-oxide-semiconductor (NMOS)), or the like, or any combination thereof. In some embodiments, the imaging senor may be covered by a color filter array (CFA) to capture color filtered image data. Image data generated by the imaging sensor with the CFA may be designated as CFA image data. The CFA may filter the light with a certain wavelength range to pixel sensors of the imaging senor. The CFA may include a Bayer filter, a RGB filter, a CYYM filter, a CYGM filter, a RGBW filter (e.g., RGBW #1, RGBW #2, RGBW #3). The most common CFA may be the Bayer filter. The Bayer filter may arrange red, green, and blue color filters on a square grid. The square grid may be arranged by 50% green filters, 25% red filters, and 25% blue filters. Image data generated by the imaging sensor with the Bayer filter is designated as Bayer image data.

In some embodiments, the data captured and/or collected by image capture device 120 may include raw data, processed data, control data, interaction data, image data, video data, analog data, digital data, or the like, or any combination thereof. In some embodiments, the image data may be a one-dimensional image, two-dimensional image (e.g. a photograph), a three-dimensional image, or a screen display image, or any combination thereof. In some embodiments, the image data may refer to values of pixels, texels, surfels, or voxels of an image.

In some embodiments, image capture device 120 may capture and/or collect image data based on electromagnet waves with various wavelengths and/or frequencies. In some embodiments, the electromagnet waves may include radio waves, microwaves, infrared radiation, visible light, ultraviolet radiation, X-rays, gamma rays, or the like, or any combination thereof.

Storage 130 may be configured to store information that may be accessible to other components of system 100 (the components of system 100, including image processing system 110, image capture device 120, storage 130, and/or display device 140). The information may include data, programs, software, algorithms, text, number, or the like, or any combination thereof. The information may be obtained from image processing system 110, image capture device 120, display device 140, or network 150, or other modules or units, or any combination thereof. In some embodiments, storage 130 may be a hard disk drive, a solid-state drive, a removable storage drive. Merely by way of example, the removable storage drive may include a flash memory disk drive, a hard drive, a tape, a CD-ROM, a cloud storage, an optical disk drive, or the like, or any combination thereof.

Display device 140 may be configured to display information. In some embodiments, display device 140 may include a keyboard, a liquid crystal display (LCD), a light emitting diode (LED) based display, a flat panel display, a cathode ray tube (CRT), a 3D display, a plasma display panel, a touch screen, a mouse, a remote controller, or the like, or any combination thereof. In some embodiments, the information displayed on display device 140 may include an image, a user interface, a value, a text, control information, a program, software, an algorithm, or the like, or any combination thereof. The image displayed may include original images, compressed images, scaled images, etc. The user interface may be a user interaction interface, a graphical user interface, or a user-defined interface, etc.

Network 150 may be configured to facilitate communications among the components of system 100, including image processing system 110, image capture device 120, storage 130, and/or display device 140. For example, data may be transmitted via network 150 from image capture device 120 to image processing system 110. As another example, data processed and/or generated by image processing system 110 gray be transmitted via network 150 to storage 130 and/or display device 140. In some embodiments, network 150 may be a wired network, a nanoscale network, a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, image processing system 110, image capture device 120, storage 130, display device 140, and network 150 may be connected to or communicate with each other directly or indirectly.

In some embodiments, two or more components of image processing system 110, image capture device 120, storage 130, display device 140, and network 150 may be integrated together. In some embodiments, image processing system 110 may be implemented in image capture device 120, storage 130, display device 140, or network 150, or any combination thereof.

In some embodiments, image processing system 110, image capture device 120, storage 130, and/or display device 140 may be integrated with each other. For example, image processing system 110 and storage 130 may be integrated in a single device. For example, image processing system 110 and image capture device 120 may be integrated in a single device. In some embodiments, one or more of the above devices may be located remote from each other.

Merely by way of example, image processing system 110 may be implemented on a cloud platform (e.g., a cloud computing platform or a cloud storing platform).

It should be understood that, the devices illustrated in FIG. 1 may be implemented via various ways. For example, in some embodiments, the devices may be implemented through hardware, software, or a combination thereof. Herein, the hardware may be implemented by a dedicated logic; the software may be stored in the storage, the system may be executed by proper instructions, e.g., by a microprocessor or a dedicated design hardware. Those skilled in the art can understand that, the method and system above may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The system and the module in the present application may be implemented by a hardware circuit in a programmable hardware device in a ultra large scale integrated circuit, a gate array chip, a semiconductor such a transistor, a field programmable gate array, a programmable logic device, a software performed by various processors, or a combination thereof (e.g., firmware).

It should be noted that, the description above is only for illustration purposes, and is not intended to limit the scope of the present application. It should be understood that, after understanding the principle of the system, those skilled in the art may make any modification or transformation to the form and details of implementation of the above methods and application of the system, in the case of not deviate from the principle. In some embodiments, image processing system 110 may also include storage 130. In some embodiments, an input device (e.g., a keyboard, a mouse, a touch screen, etc.) may be integrated with the display device 140.

Figure 2:
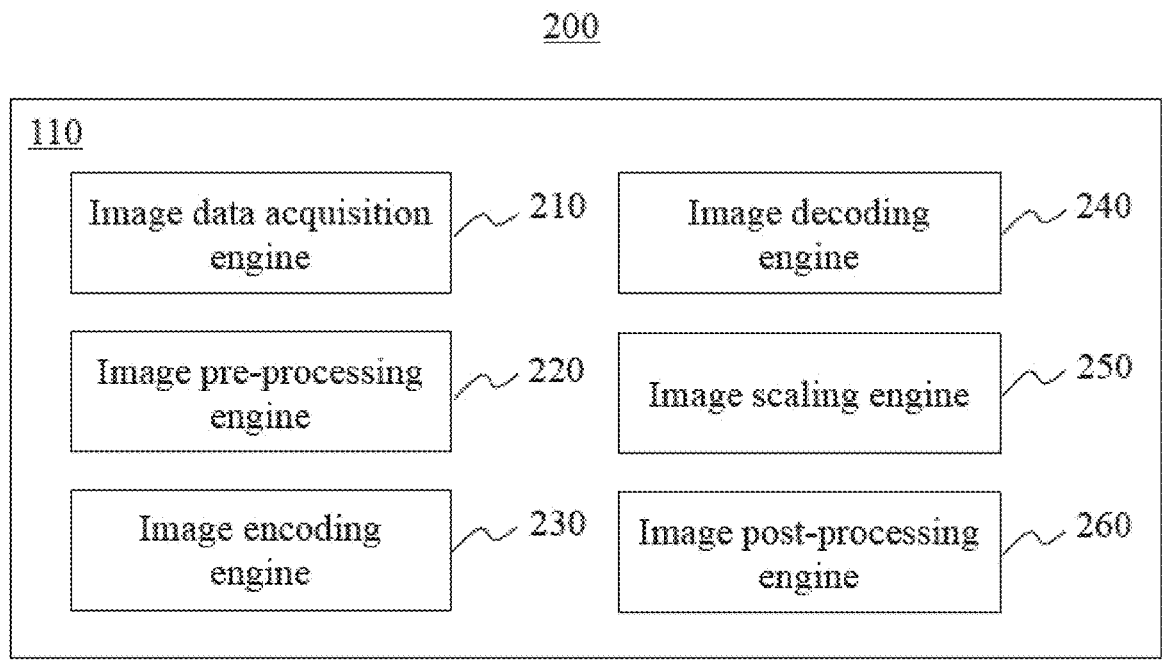
FIG. 2 is a schematic diagram illustrating an exemplary image processing system according to some embodiments of the present disclosure.

Referring FIG. 2, imaging processing system 10 may include an image data acquisition engine 210, an image pre-processing engine 220, an image encoding engine 230, an image decoding engine 240, an image scaling engine 250, and an image post-processing engine 260. Generally, the words "engine," "module," and "unit" as used herein, refer to logic embodied in hardware or firmware, or to a collection of software instructions. The engines, modules, and units described herein may be implemented as software and/or hardware modules and may be stored in any type of non-transitory computer-readable medium or other storage device. In some embodiments, a software module can be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

Image data acquisition engine 210 may be configured to receive data. In some embodiments, the data may include raw data, processed data, control data, interaction data, image data, video data, analog data, digital data, or the like, or any combination thereof. The image data may be obtained from an image (e.g., a still image) or a video (or a video frame thereof). For example, the image data may include color image data, CFA image data, Bayer image data, digital image data, or analog image data, or the like, or any combination thereof. In some embodiments, the data may be acquired from image capture device 120, storage 130, display device 140, or network 150, or other device capable of generating data, or the like, or any combination thereof.

Image pre-processing engine 220 may be configured to pre-process the received data. In some embodiments, image pre-processing engine 220 may employ one or more processors to complement processing operations. The processor may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), or the like, or any circuit or processor capable of executing one or more functions, or any combinations thereof. In some embodiments, image pre-processing engine 220 may also include a memory (e.g., a random access memory (RAM) or a read only memory (ROM).

In some embodiments, the data to be pre-processed by image pre-processing engine 220 may be obtained from image data acquisition engine 210. In some embodiments, the pre-processed data may be further processed by image encoding engine 230, image scaling engine 250, and/or image post-processing engine 260. In some embodiments, the pre-processed data may be stored in a local storage or storage 130 (via network 150).

In some embodiments, image pre-processing engine 220 may communicate with image data acquisition engine 210, image encoding engine 230, image scaling engine 240, and image post-processing engine 260, or the like, or any combination thereof. In some embodiments, image pre-processing engine 220 may be integrated with image encoding engine 230, or image post-processing engine 260, or any combination thereof. In some embodiments, image pre-processing engine 220 may be optional.

Figure 3:
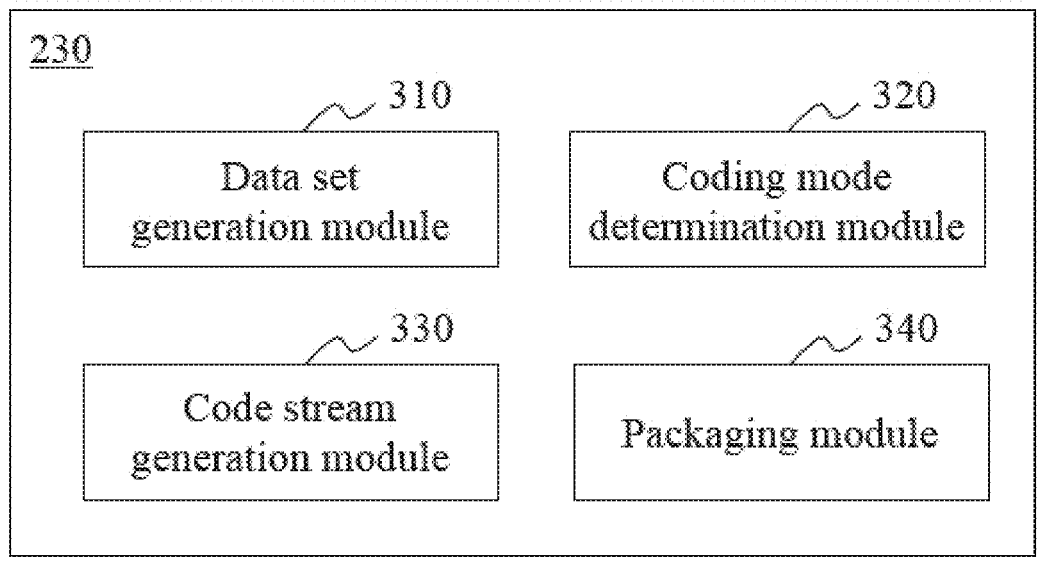
FIG. 3 is a schematic diagram illustrating an exemplary image encoding engine according to some embodiments of the present disclosure.

In some embodiments, image encoding engine 230 may be configured to encode the image data. In some embodiments, image encoding engine 230 may include a central processing unit (CPU), an application specific integrated circuit (ASIC), an application specific instruction set processor (ASID), a physics processing unit (PPU), a digital processing processor (DSP), a field-programmable gate array (FPGA), a programmable logic device (PLD), a processor, a microprocessor, a controller, a microcontroller, an algorithm, or any equipment capable of converting data from one formator code to another, or the like, or any combinations thereof. In some embodiments, image encoding engine 230 may include functional blocks such as a data set generation module 310, a coding mode determination module 320, a code stream generation module 330, a packaging module 340 (as illustrated in FIG. 3), an analog processor, a luma/chroma (Y/C) separation processor, a chroma processor, a luma processor, a clock/timing processor, an analog/digital converter, an output formatter, a host communication interface, or the like, or any combination thereof.

In some embodiments, image encoding engine 230 may include a software program. The software program may be compiled and linked into an executable program. The software program may be callable from other modules or from themselves. The software program configured for execution on computing devices (e.g., image encoding engine 230) may be provided on a computer readable medium, such as a compact disc, a digital video disc, a flash drive, a magnetic disc, or any other tangible medium, or the like, or any combination thereof.

In some embodiments, the computer readable medium may include a propagated data with computer readable program code embodied therein. The propagated data may include an electro-magnetic form, an optical form, or the like, or any combination thereof. Program code embodied on the computer readable medium may be transmitted using any appropriate medium, including wireless, wired, optical fiber cable, RF, or the like, or any combination thereof.

In some embodiments, the software program may include one or more software codes. The software codes may be stored, partially or fully, on a memory device of the executing computing device, for execution by the computing device. The software code may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

In some embodiments, image encoding engine 230 may input, encode, or output different formats of data (e.g., image data, video frame data). According to the format encoded, the image encoding engine 230 may include an H.265/MPEG-H HEVC coder, an H.264/MPEG-4 AVC coder (e.g., x264, Nero Digital, Quick Time H.264, DicX Pro coder), an H.263/MPEG-4 Part 2 coder, an H.262/MPEG-2 coder, an Microsoft coder (e.g., Windows Media Video (WMV) MS MPEG-4v3)), Google On2 coder, Apple ProRes, DNxHD coder, or Indeo coder, or the like, or any combination thereof.

In some embodiments, image encoding engine 230 may reduce image quality to achieve compression. In some embodiments, image encoding engine 230 may retain all of information present in the original image.

In some embodiments, image encoding engine 230 may communicate with image data acquisition engine 210, image pre-processing engine 220, image decoding engine 240, image scaling engine 250, and image post-processing engine 260, or the like, or any combination thereof. In some embodiments, image encoding engine 230 may be integrated with image decoding engine 240, or image post-processing engine 260, or any combination thereof. In some embodiments, image encoding engine 230 may be optional.

In some embodiments, image decoding engine 240 may be configured to decode image data. In some embodiments, image decoding engine 240 may include a central processing unit (CPU), an application specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, an algorithm, or any equipment capable of converting data from one format or code to another, or the like, or any combinations thereof.

Figure 5:
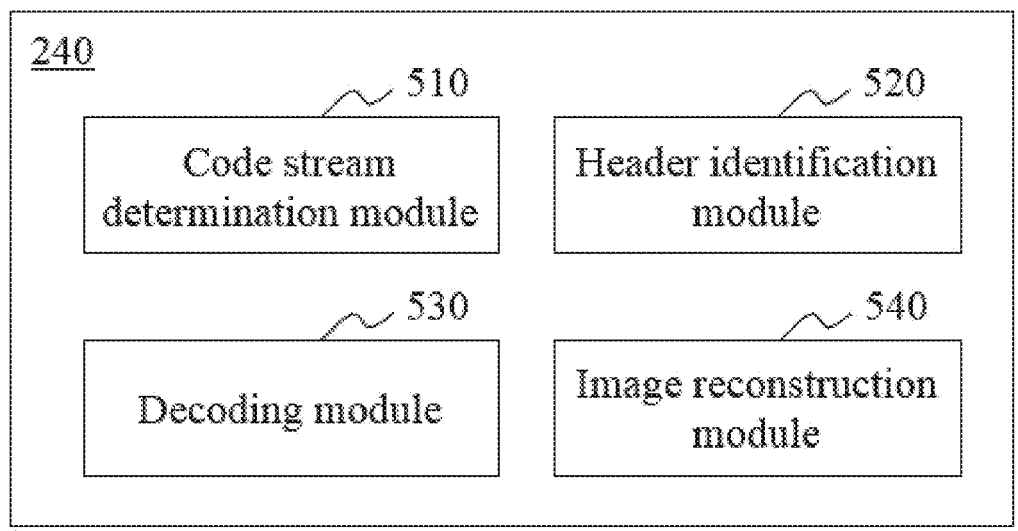
FIG. 5 is a schematic diagram illustrating an exemplary image decoding engine according to some embodiments of the present disclosure.

In some embodiments, image decoding engine 240 may include functional blocks such as a code stream acquisition module 510, a header identification module 520, a decoding module 530, an image reconstruction module 540 (as illustrated in FIG. 5), an analog processor, a Y/C separation processor, a chroma processor, a luma processor, a clock/timing processor, an analog/digital converter, an output formatter, a host communication interface, or the like, or any combination thereof.

In some embodiments, image decoding engine 240 may include a software program. The software program may be compiled and linked into an executable program. The software program can be callable from other modules or from themselves. The software program configured for execution on computing devices (e.g., image decoding engine 240) can be provided on a computer readable medium, such as a compact disc, a digital video disc, a flash drive, a magnetic disc, or any other tangible medium, or any combination thereof.

In some embodiments, image decoding engine 240 may input, decode, or output different formats of data (e.g., image data, video frame data). According to the format encoded, image decoding engine 240 may include an H.265/MPEG-H HEVC coder, an H.264/MPEG-4 AVC coder (e.g., x264, Nero Digital, Quick Time H.264, DicX Pro coder), an H.263/MPEG-4 Part 2 coder, an H.262/MPEG-2 coder, an Microsoft coder (e.g., Windows Media Video (WMV) MS MPEG-4v3)), Google On2 coder, Apple ProRes, DNxHD coder, or Indeo coder, or the like, or any combination thereof.

In some embodiments, image decoding engine 240 may communicate with image data acquisition engine 210, image pre-processing engine 220, image encoding engine 230, image scaling engine 250, and image post-processing engine 260, or the like, or any combination thereof. In some embodiments, image decoding engine 240 gray be integrated with image encoding engine 230, or image post-processing engine 260, or any combination thereof. In some embodiments, image decoding engine 240 may be unnecessary for the operations of image processing system 110.

In some embodiments, image scaling engine 250 may be configured to compress image data. In some embodiments, image scaling engine 250 may include a filter, a central processing unit (CPU), an application specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, an algorithm, or any equipment capable of converting data from one format or code to another, or the like, or any combinations thereof. In some embodiments, the filter may include a digital filter, or an analog filter. The digital filter may include a recursive filter (infinite impulse response (IIR) filters) or a nonrecursive filter (finite impulse response (FIR) filters), or the like, or any combination thereof. The digital filter may include a Direct form I filter, a Direct Form II filter, or a Cascaded second-order section filter, Lattice and ladder filter, State-space structures filter, a Wave Digital filter (WDF), an Agarwal-Burrus filter, a Harris-Brooking filter, a ND-TDL filter, a Sallen-key and state variable filter, or the like, or any combination thereof.

In some embodiments, the filter may further include a smoothing filter or an interpolation filter for compressing image data. In some embodiments, the smoothing filter may include an additive smoothing filter, a butterworth filter, an exponential smoothing filter, a Kalman filter, a Kernel smoother, a Kolmogorov-Zurbenko filter, a Laplacian smoothing filter, a Ramer-Douglas-Peucker algorithm filter, a Savitzky-Golay smoothing filter, or the like, or any combination thereof. In some embodiments, the interpolation filter may include a nearest-neighbor interpolation filter, a linear interpolation filter, a polynomial interpolation filter, a spline interpolation filter, a rational interpolation filter, a trigonometric interpolation filter, a multivariate interpolation filter (e.g., a bilinear interpolation filter, a bicubic interpolation filter, a trilinear interpolation filter), or the like, or any combination thereof.

Figure 7:
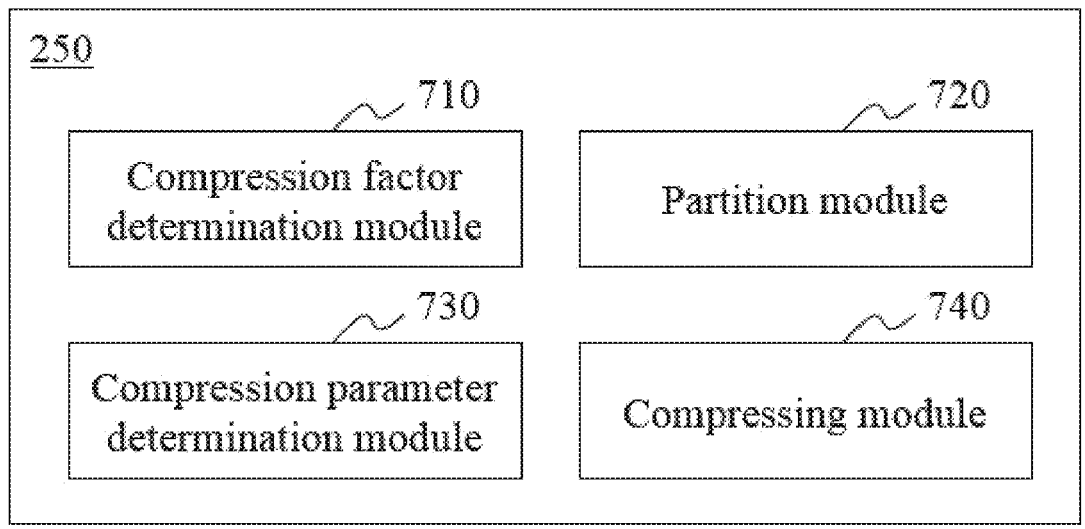
FIG. 7 is a schematic diagram illustrating an exemplary image scaling engine according to some embodiments of the present disclosure.

In some embodiments, image scaling engine 250 may include functional blocks such as a compression factor determination module 710, a partition module 720, a compression parameter determination module 730, and a compressing module 740 (as illustrated in FIG. 7). In some embodiments, image scaling engine 250 may include a software program. The software program may be used to execute instructions from image scaling engine 250. The software program can be callable from other modules or from themselves. The software program configured for execution on a computing device (e.g., image scaling engine 250) may be provided on a computer readable medium, such as a compact disc, a digital video disc, a flash drive, a magnetic disc, or any other tangible medium, or the like, or any combination thereof.

The image scaling engine 250 may compress image data by using one or more algorithms. The algorithms may include a Nearest-neighbor interpolation, a Bilinear and bicubic algorithm, a Sinc and Lanczos resampling, a Box sampling, Mipmap, a Fourier transform methods, an Edge-directed interpolation, a Vectorization, an hqx, or the like, or any combination thereof.

In some embodiments, image scaling engine 250 may perform one or more processing procedures for compressing image data of a still image or a video frame. The processing procedures may be implemented by a hardware, software, for example, a hardware circuit in a programmable hardware device in a ultra large scale integrated circuit, a gate array chip, a semiconductor such as a transistor, a field programmable gate array, a programmable logic device, a software performed by various processors, and a combination thereof (e.g., firmware).

In some embodiments, image post-processing engine 260 may be configured to post-process image data. In some embodiments, image post-processing engine 260 may include a central processing unit (CPU), an application specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, an algorithm, or any equipment capable of converting data from one format or code to another, or the like, or any combinations thereof.

In some embodiments, image post-processing engine 260 may communicate with image data acquisition engine 210, image pre-processing engine 220, image encoding engine 230, image decoding engine 240, or image scaling engine 250, or the like, or any combination thereof. In some embodiments, image post-processing engine 260 may be integrated with image pre-processing engine 220, image encoding engine 230, image decoding engine 240, image scaling engine 250, or any combination thereof. In some embodiments, image post-processing engine 2600 may be optional.

Referring to FIG. 3, image encoding engine 230 may include a data set generation module 310, a coding mode determination module 320, a code stream generation module 330, and a packaging module 340.

Data set generation module 310 may be configured to generate one or more data sets for an image. In some embodiments, a data set may refer to a data matrix. A data set may include one or more data values regarding a pixel or pixel group in the image. A pixel group may refer to a plurality of pixels in the image. For example, a pixel group may include a column of pixels, a row of pixels, a matrix of pixels, or all the pixels of the image. A data value may include a component of pixel value. In some embodiments, a pixel value may refer to information of a pixel, for example, position, depth, luma, color, grey level, or the like, or any combination thereof. In some embodiments, a pixel value may have two or more components (e.g., two or more kinds of information listed above) regarding a pixel, and a data value may correspond to one component value. Merely by way of example, if a pixel value has a luma component and a chroma component, a data value may include a luma value, a chroma value, or a value calculated based on the luma value or chroma value. Accordingly, a date set may include one or more luma values, one or more chroma values, values calculated based on the luma value(s) and/or chroma value(s), and/or any combination thereof. It should be noted that, in some embodiments, data set generation module 310 may further generate one or more data sets based on existing data set(s). Existing data set(s) may include data set(s) previously generated by data set generation module 310, or data set(s) previously acquired from a local storage or storage 130 (via network 150). In some embodiments, data set generation module 310 may transmit generated data set(s) to storage 130 for storing, or an external data source via network 150.

Coding mode determination module 320 may determine a coding mode for the data set generated. A coding mode may include a method of encoding the image. A method of encoding the image may include one or more coding parameters for encoding the image. In some embodiments, different data sets may have different coding modes, the same coding mode with the same coding parameters, or the same coding mode with different coding parameters. In some embodiments, coding mode determination module 320 may determine a coding mode for the data set from a plurality of coding modes. In some embodiments, coding mode determination module 320 may determine whether or not to encode a data set based on comparison between the results of one or more coding modes and those of no encoding.

Code stream generation module 330 may generate one or more code streams. A code stream may refer to a data stream deriving from a data set. In some embodiments, a code stream may be a stream of binary numbers. In some embodiments, a data stream may be an encoded stream of the data set. In some embodiments, a data stream may be a non-encoded stream of the data set (i.e., the original data stream of the data set). In some embodiments, code stream generation module 330 may generate one or more code streams through processing existing code stream(s). Existing code stream(s) may include code stream(s) previously generated by code stream generation module 330, or code stream(s) previously acquired from a local storage or storage 130 (via network 150). In some embodiments, code stream generation module 330 may generate a code stream based on the one or more coding modes determined by coding mode determination module 320. In some embodiments, code stream generation module 330 may transmit generated code stream(s) to a local memory or storage 130 (via network 150) for storing.

Packaging module 340 may package the generated stream(s) into a modified code stream. In some embodiments, packaging module 340 may generate a header for the modified code stream. A header may include information regarding the coding mode of the code stream(s), the length of code stream(s), whether the code stream(s) are encoded or not, one or more pixel values, or the like, or any combination thereof. In some embodiments, packaging module 340 may package the header and the modified code stream into an integral code stream. In some embodiments, packaging module 340 may place the header in a predetermined position (e.g., the head of a code stream, the end of a code stream, or any other site in a code stream). In some embodiments, packaging module 340 may transmit the modified code stream, the header, and/or the integral code stream to a local storage or storage 130 (via network 150) for storing.

Figure 4:
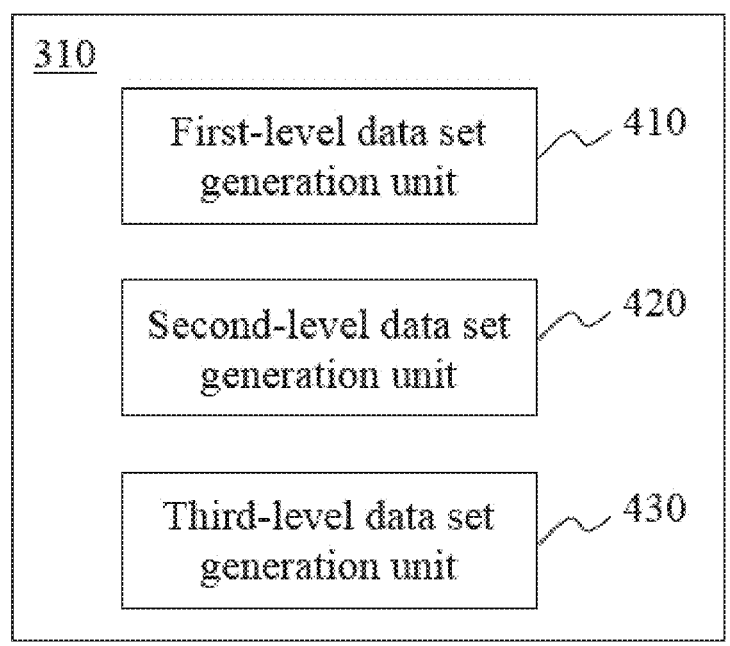
FIG. 4 is a schematic diagram illustrating an exemplary data set generation module according to some embodiments of the present disclosure.

Referring FIG. 4, data set generation module 310 may include a first-level data set generation unit 410, a second-level data set generation unit 420, and a third-level data set generation unit 430. First-level data set generation unit 410 may generate one or more first-level data sets from an image. In some embodiments, a first-level data set may refer to a data matrix. A first-level data set may include one or more pixel values. In some embodiments, a first-level data set may refer to a data set derived from an original pixel value of a pixel. Merely by way of example, the original pixel value of a pixel P may be expressed as $(V_1, \ldots, V_M)$, the first-level data set may be expressed as $(V_i, \ldots, V_j)$. Wherein, V may represent a component value, M (M may be an integer, M≥1) may refer to Mth component (e.g., position, depth, luma, color, grey level, or the like, or any combination thereof) of the pixel P, $(V_1, \ldots, V_M)$ may refer to M values of different components of the pixel P (e.g., $V_1$ may refer to luma value, $V_M$ may refer to chroma value, etc.), i may be an integer, j may be an integer (M≥j≥i≥1), and $(V_i, \ldots, V_j)$ may refer to a subset of $(V_1, \ldots, V_M)$.

In some embodiments, a first-level data set may refer to a data set derived from original pixel values of a pixel group. Merely by way of example, the pixel group may have N pixels (N may be an integer, N≥2), and the first-level data set may be expressed as $[(V_{1i}, \ldots, V_{1j}), \ldots, (V_{Ni}, \ldots, V_{Nj})]$. Wherein, $V_{1i}$ may refer to the ith component value of the 1st pixel, $V_{1j}$ may refer to the jth component value of the 1st pixel, $V_{Ni}$ may refer to the ith component value of the Nth pixel, $V_{Nj}$ may refer to the jth component value of the Nth pixel. It should be noted that the original pixel value(s) of a pixel or pixel group may refer to the pixel value(s) before encoding and/or decoding process, and not necessarily refer to value(s) as acquired by image capture device 120.

In some embodiments, first-level data set generation unit 410 may modify a first-level data set. The first-level data set may have one or more variant forms. For example, one or more data $V_x$ in data set $(V_i, \ldots, V_j)$ or $[(V_{1i}, \ldots, V_{1j}), \ldots, (V_{Ni}, \ldots, V_{Nj})]$ may be transformed as $aV_x+b$ (a and/or b may be real numbers). In some embodiments, M may be different for different images according to a color space of the images. The color space may be a specific organization of colors. For example, a pixel of YCbCr format image may have a luma component, a blue-difference chroma component, and a red-difference chroma component. Accordingly, in this example, M may be no less than 3. In some embodiments, the color may be filtered by image capture device 120 with a color filter array (CFA), and a CFA image may be generated. A pixel of the CFA image may have one color component (e.g., red, green, or blue component). Accordingly, in this example, M may be no less than 1. In some embodiments, first-level data set generation unit 410 may transmit generated (or modified) first-level data set to a local storage or storage 130 (via network 150) for storing.

Second-level data set generation unit 420 may generate one or more second-level data sets. In some embodiments, a second-level data set may refer to a data matrix. In some embodiments, a second-level data set may refer to a data set derived from one or more first-level data sets. A second-level data set may include one component value of a pixel, or values of the same component in a pixel group. Merely by way of example, supposing a first-level data set is expressed as $(V_i, \ldots, V_j)$, a second-level data set may include a component value $V_y$ (y may be an integer, j≥y≥i). As another example, supposing a first-level data set is expressed as $[(V_{1i}, \ldots, V_{1j}), \ldots, (V_{Ni}, \ldots, V_{Nj})]$, a second-level data set may include values of the same component in the first-level data set, i.e., $(V_{1y}, \ldots, V_{Ny})$. In some embodiments, second-level data set generation unit 420 may modify a second-level data set. The second-level data set may have one or more variant forms. For example, one or more elements of the second-level data set may be transformed. The data transformation may be realized based on one or more transformation functions or transformation matrices. As another example, second-level data set generation unit 420 may combine two or more second-level data sets, and/or transformed second-level data sets into one modified second-level data set. As another example, second-level data set generation unit 420 may generate under sampled second-level data set(s) based on previously generated second-level data set(s) and/or first-level data set(s). In some embodiments, second-level data set generation unit 420 may transmit generated second-level data set(s) to a local storage or storage 130 (via network 150) for storing.

Third-level data set generation unit 430 may generate one or more third-level data sets. In some embodiments, a third-level data set may refer to a data matrix. In some embodiments, a third-level data set may refer to a data set derived from one or more second-level data sets. In some embodiments, third-level data set generation unit 430 may generate a third-level data set based on a bit operation on the data of the second-level data set(s). The bit operation may include bit shifting, AND operation, NOT operation, OR operation, and/or XOR operation. In some embodiments, third-level data set generation unit 430 may generate a third-level data set based on a bit extraction from the data of the second-level data set(s). Specifically, third-level data set generation unit 430 may extract one or more bits from second-level data set(s), and the extracted bits may form one or more third-level data sets. Merely by way of example, supposing an element of second-level data set(s) is expressed by N binary numbers (that is, the element has N bits), one or more bits may be extracted from the N bits, and the extracted bits from one or more second-level data sets may form a bit string, and a third-level data set may include the bit string. In some embodiments, third-level data set generation unit 430 may modify or transform one or more data in the second-level data set before or during the third-level data set generation. In some embodiments, third-level data set generation unit 430 may transmit generated third-level data set to a local storage or storage 130 (via network 150) for storing.

Referring FIG. 5, image decoding engine 240 may include a code stream determination module 510, a header identification module 520, a decoding module 530, and an image reconstruction module 540. Code stream determination module 510 may determine one or more code streams. In some embodiments, code stream determination module 510 may acquire one or more code streams from a local storage or storage 130 (via network 150). In some embodiments, code stream determination module 510 may generate one or more sub-streams based on acquired code stream(s). For example, code stream determination module 510 may partition acquired code stream(s) into a plurality of sub-streams. As another example, a code stream may be a stream of binary number, and code stream determination module 510 may extract one or more binary numbers from the code stream, and one or more sub-streams may be formed based on the extracted one or more binary numbers.

Header identification module 520 may identify one or more headers of code steam(s) corresponding to data set(s). In some embodiments, a header may be included in a code stream. In some embodiments, header identification module 520 may recognize a header based on a predetermined position in the code stream. The header may be placed in the predetermined position during packaging. In some embodiments, header identification module 520 may extract a header based on the length of the header. In some embodiments, header identification module 520 may, based on the identified header, identify the coding mode of code stream(s), the length of code stream(s), whether the code stream(s) is encoded or not, one or more pixel values, or the like, or any combination thereof.

Decoding module 530 may decode one or more code streams. In some embodiments, decoding module 530 may decode a code stream based on an inverse operation of the coding mode applied during encoding. In some embodiments, decoding module 530 may generate one or more data sets (e.g., third-level data set(s), second-level data set(s), and/or first-level data set(s)) based on a code stream. In some embodiments, decoding module 530 may transmit the generated data set(s) to a local storage or storage 130 (via network 150) for storing.

Image reconstruction module 540 may reconstruct an image based on the generated data set(s). In some embodiments, Image reconstruction module 540 may reconstruct an image based on a plurality of data sets. One or more data sets for image reconstruction may be generated by decoding module 530, or acquired from a local storage or storage 130 (via network 150). In some embodiments, the reconstructed image may be a portion of a full image (e.g., a row, a column, or a region of the full image). In some embodiments, image reconstruction module 540 may transmit the reconstructed image to display device 140 for displaying. In some embodiments, image reconstruction module 540 may transmit reconstructed image to image scaling engine 250 for image scaling, or image post-processing engine 260 for further processing.

Figure 6:
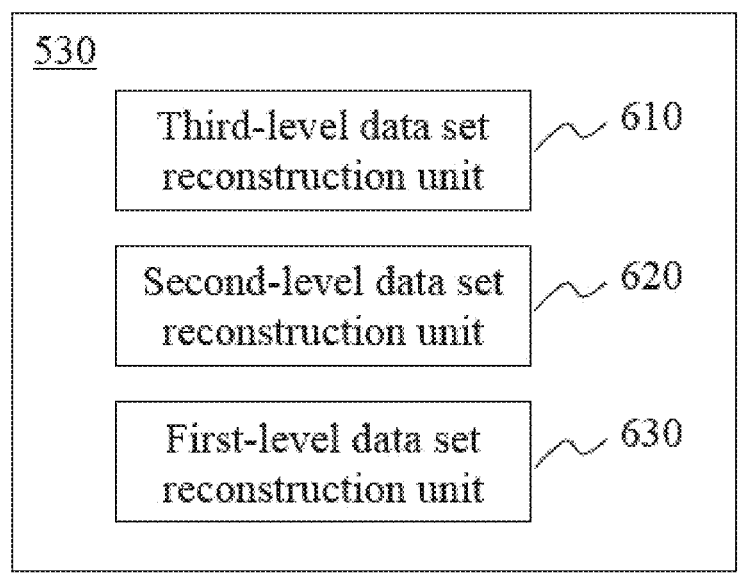
FIG. 6 is a schematic diagram illustrating an exemplary decoding module according to some embodiments of the present disclosure.

Referring FIG. 6, decoding module 530 may include a third-level data set reconstruction unit 610, a second-level data set reconstruction unit 620, and a first-level data set reconstruction unit 630. Third-level data set reconstruction unit 610 may reconstruct third-level data set. Third-level data set reconstruction may refer to a conversion process from a code stream to a third-level data set. In some embodiments, third-level data set reconstruction unit 610 may convert a code stream to a third-level data set based on a header of the code stream. Third-level data set reconstruction unit 610 may acquire information regarding whether the code stream is encoded or not. In some embodiments, if the code stream is not encoded, third-level data set reconstruction unit 610 may treat the code stream as one or more third-level data sets. In some embodiments, if the code stream is encoded, third-level data set reconstruction unit 610 may identify the coding mode of the code stream and/or the length of the code stream based on the header of the code stream. Further, third-level data set reconstruction unit 610 may perform an inverse operation of the encoding process and obtain one or more third-level data sets. It should be noted that third-level data set reconstruction unit 610 may process the code stream before third-level data set reconstruction. The processing of the code stream may include partitioning the code stream into a plurality of sub-streams, modifying the code stream or sub-streams, and/or removing or extracting one or more codes from the code stream. In some embodiments, third-level data set reconstruction unit 610 may transmit reconstructed third-level data set to a local storage or storage 130 (via network 150) for storing.

Second-level data set reconstruction unit 620 may reconstruct second-level data set. Second-level data set reconstruction may refer to a process converting a third-level data set to a second-level data set. In some embodiments, second-level data set reconstruction unit 620 may reconstruct a second-level data set based on two or more third-level data sets. In some embodiments, second-level data set reconstruction unit 620 may perform an inverse operation of the third-level data set generation process performed by third-level data set generation unit 430. In some embodiments, second-level data set reconstruction unit 620 may use different methods of reconstructing according to the methods for generating the third-level data sets.

First-level data set reconstruction unit 630 may reconstruct a first-level data set. First-level data set reconstruction may refer to a process converting a third-level data set or a second-level data set to a first-level data set. In some embodiments, first-level data set reconstruction unit 630 may reconstruct a first-level data set based on two or more second-level data sets. In some embodiments, first-level data set reconstruction unit 630 may perform an inverse operation of the second-level data set generation process performed by second-level data set generation unit 420. In some embodiments, first-level data set reconstruction unit 630 may extract one or more pixel values from one or more second-level data sets, and generate a first-level data set.

Referring FIG. 7, image scaling engine 250 may include a compression factor determination module 710, a partition module 720, a compression parameter determination module 730, and a compressing module 740.

In some embodiments, compression factor determination module 710 may be configured to determine a compression factor. The compression factor may be a compression ratio or a number of tap(s) of a filter, or any combination thereof. The compression ratio may be used in compressing image data in horizontal or vertical direction. The compression ratio may be determined by a system default or defined by a user. In some embodiments, the compression ratio may be defined as follows:

$$\text{compression ratio} = \frac{\text{uncompressed size}}{\text{compressed size}}, \quad (1)$$

wherein "uncompressed size" may be the size of the uncompressed image data; "compressed size" may be the size of the compressed image data. In some embodiments, the compression ratio may be 1.2, 1.5, 2, 3, or 4, or any other real number. For example, if uncompressed size is 2M and compressed size is 1M, the compression ratio may be 2.

In some embodiments, the compression ratio may be defined as follow:

$$\text{compression ratio} = \frac{n}{m}, \quad (2)$$

wherein m<n, and n may be denoted as a total number of rows (or columns) of the image data uncompressed; m may be demoted as a total number of rows (or columns) of the image compressed. For example, if n is 120 and m is 60, the compression ratio may be 2.

In some embodiments, the number of tap(s) of a filter may be preset by image processing system 110. The number of tap(s) of a filter may be determined by a system default or defined by a user. The number of tap(s) of a filter may be determined based on compressed effect of the image data. The compressed effect may be determined by the compression ratio for the image data. For example, if the compression ratio is 4, the number of taps of a filter may be equal to or greater than 6; if the number of tap(s) of a filter is less than 6, the compressed effect may be deceased.

In some embodiments, partition module 720 may be configured to partition the image data into a plurality of data sets. In some embodiments, the image data set may include a plurality of rows and/or columns. In some embodiments, the image data may be partitioned based on the compression factor. The compression factor may include the compression ratio and/or the number of tap(s) of a filter. For example, if the compression ratio is used in compressing image data in horizontal direction, the image data set may include K reference rows, wherein K may equal to the number of tap(s) of a filter; if the compression ratio is used in compressing image data in vertical direction, the image data set may include K reference columns, wherein K may equal to the number of tap(s) of a filter. In some embodiments, if the compression ratio is used in compressing image data in horizontal direction, the image data set partitioned by the first few rows may include K reference rows, wherein K may be less than the number of tap(s) of a filter; if the compression ratio is used in compressing image data in vertical direction, the image data set partitioned by the first columns may include K reference columns, wherein K may be less than the number of tap(s) of a filter.

In some embodiments, an image data set may be compressed into a single row or a single column. The image data compressed may include a plurality of compressed rows or compressed columns In some embodiments, the compressed rows may be compressed by the data set with K reference rows, and the compressed columns may be compressed by the data set with K reference columns. In some embodiments, a compressed row i may be derived from specific rows of the image data, and a compressed column i may be derived from specific columns of the image data. In some embodiments, a specific row k in the image data may be determined as follows:

$$k = \lfloor i \times \lambda \rfloor, \quad (3)$$

wherein the operator $\lfloor\ \rfloor$ may represent rounding down. For example, if the number of taps of a filter is 6, the reference rows in the image data corresponding to the compressed row i may include row k-2, row k-1, row k, row k+1, row k+2, and row k+3.

In some embodiments, compression parameter determination module 730 may be configured to determine compression parameters. In some embodiments, the compression parameters may be determined based on compression parameter group(s). The compression parameter group may be determined according to compression parameter table(s).

In some embodiments, a compression parameter table may be related to the compression ratio. The compression parameter table may include a default compression parameter table, a calculated compression parameter table, or any combination thereof. The default compression parameter table may be generated based on relevant principles and the corresponding compression ratio. The relevant principles may include an information theory, an entropy theory, Kolmogorov complexity, a lossy compression, a quantization, a rate—distortion theory, a redundancy, a timeline of information theory, a numerical method, an experimental adjustment, a spline method, a cubic interpolation method, a linear interpolation method, a nearest interpolation, a simulation experiment, or the like, or any combination thereof. The compression ratio may be 1.2, 1.5, 2, 3, or 4, or the like, or any other real number. In some embodiments, a compression parameter table may include N compression parameter groups. In some embodiments, a compression parameter group may include K compression parameters, wherein K may equal to the number of tap(s) of a filter. In some embodiments, N may be determined as follow:

$$N = 2^n, \quad (4)$$

wherein n may be an integer greater than 1. The value of N may affect accuracy of the compression. For example, if N is no larger than 32, N may be proportional to the accuracy of the compression. If N is larger than 32, N may have little effect on the accuracy of the compression. In consideration of calculation quantity, accuracy of compression, etc., N may be set as 32.

In some embodiments, compressing module 740 may be configured to compress the image data. In some embodiments, the image data may be compressed according to the image data sets, the compression factor, and/or the compression parameter(s). In some embodiments, the compressed image data may be used to generate a compressed image.

In some embodiments, operations of compressing module 740 may be implemented through hardware, software, or a combination thereof. Herein, the hardware may be implemented by a filter, or a dedicated logic. The software may be stored in a local storage device or storage 130, and may be executed by proper instructions, for example, by a microprocessor or a dedicated design hardware. Those skilled in the art can understand that, the method and system above may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The system and the module in the present application may be implemented by a hardware circuit in a programmable hardware device in a ultra large scale integrated circuit, a gate array chip, a semiconductor such a transistor, a field programmable gate array, a programmable logic device, a software performed by various processors, or a combination thereof (e.g., firmware).

Figure 8:
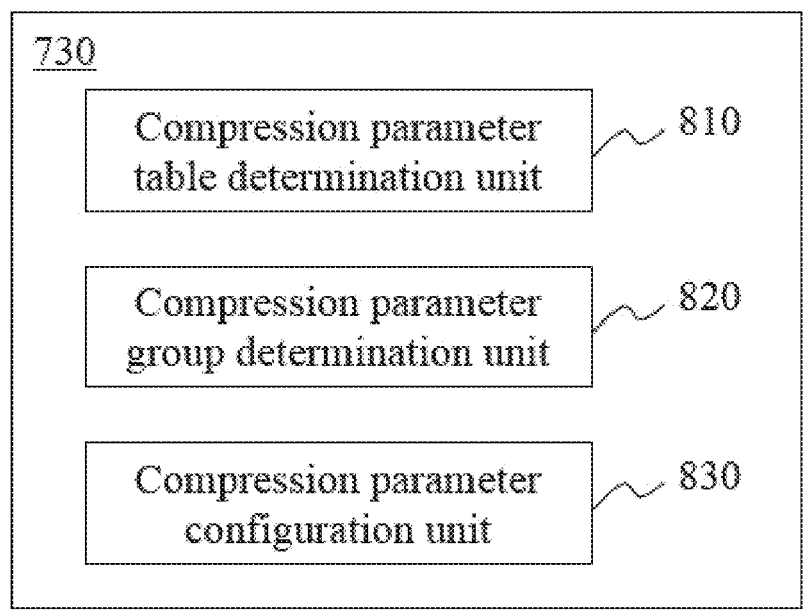
FIG. 8 is a schematic diagram illustrating an exemplary compression parameter determination module according to some embodiments of the present disclosure.

Referring FIG. 8, compression parameter determination module 730 may include a compression parameter table determination unit 810, a compression parameter group determination unit 820, and a compression parameter configuration unit 830. In some embodiments, compression parameter table determination unit 810, compression parameter group determination unit 820, and compression parameter configuration unit 830 may be in communication with each other. For example, the compression parameter table determined by compression parameter table determination unit 810 may be used by compression parameter group determination unit 820 or compression parameter configuration unit 830.

In some embodiments, compression parameter table determination unit 810 may be configured to determine a compression parameter table. In some embodiments, a compression parameter table may include a plurality of compression parameter groups. In some embodiments, the determined compression parameter table may be used by compression parameter group determination unit 820 or compression parameter configuration unit 830. In some embodiments, the compression parameter table may be acquired from a storage (e.g., a local storage, storage 130, and/or a storage (not shown) in image scaling engine 250) by compression parameter table determination unit 810. For example, the compression parameter table may be stored in compression parameter table determination unit 810. For example, the acquired compression parameter table stored in image processing system 110 may be generated based on relevant principles and the corresponding compression ratio. In some embodiments, the acquired compression parameter table for the corresponding compression ratio 1.2 may be based on a spline method. In some embodiments, the compression parameterable may be calculated and/or determined by compression parameter table determination unit 810, or any other unit capable of calculating or processing, or the like, or any combination thereof. In some embodiments, parameter table determination unit 810 may determine compression parameter table(s) through calculations. For example, the compression parameter table may be determined based on a first candidate compression parameter table and a second candidate compression parameter table. The first candidate compression parameter table and the second candidate compression parameter table may be acquired directly from a storage (e.g., a local storage, storage 130, and/or a storage (not shown) in image scaling engine 250). For further example, the compression parameter table may be calculated as $P_{zm}(k)=P_{zs}(k) \times W_{zs}+P_{zl}(k) \times W_{zl}$, wherein $P_{zm}(k)$ may be a compression parameter k in the compression parameter table, $P_{zs}(k)$ may be a compression parameter k in the first candidate compression parameter table, $P_{zl}(k)$ may be a compression parameter k in the second candidate compression parameter table, and $W_{zs}$ and $W_{zl}$ may be weight factors.

In some embodiments, compression parameter group determination unit 820 may be configured to determine one or more compression parameter groups. In some embodiments, the determined compression parameter groups) may be used by compression parameter configuration unit 830. In some embodiments, the compression parameter group(s) may be stored in the system, and compression parameter group deter determination unit 820 may determine the compression parameter group(s) according to a compression parameter table. For example, a compression parameter table may include 32 compression parameter groups. In some embodiments, compression parameter group determination unit 820 may determine a compression parameter group through calculations.

In some embodiments, compression parameter configuration unit 830 may be configured to determine one or more compression parameters. In some embodiments, the compression parameters may be determined based on a compression parameter group. In some embodiments, the number of the compression parameters in the compression parameter group may equal to the number of tap(s) of a filter. For example, when the number of taps of a filter is 6, the number of the compression parameters for the image data may be 6. In some embodiments, the compression parameters may be stored in the system and be acquired by compression parameter configuration unit 830.

Referring to FIG. 9-A, image scaling apparatus 900 may be an exemplary embodiment of image scaling engine 250. Image scaling apparatus 900 may include a compression ratio determination unit 901, a data set determination unit 902, a compression parameter table determination unit 903, a compression parameter group determination unit 904, and a compression pressing unit 905. In some embodiments, compression ratio determination unit 901 may be configured to obtain the compression ratio for compressing the image data in a first direction, and the number of tap(s) of a filter for compressing the image data.

In some embodiments, data set determination unit 902 may be configured to determine M image data sets from the image data of an original image, based on the compression ratio and the number of tap(s) of a filter. In some embodiments, if the first direction is a horizontal direction, an image data set may contain K columns. The pixel values in an image data set may be compressed into a single column. In some embodiments, if the first direction is a vertical direction, an image data set may contain K rows. The pixel values in an image data set may be compressed into a single row. K may be designated as the number of tap(s) of a filter.

In some embodiments, compression parameter table determination unit 903 may be configured to obtain a compression parameter table based on the corresponding compression ratio. A compression parameter table may correspond to a compression ratio. A compression parameter table may contain N compression parameter groups, wherein N may be an integer greater than 1. A compression parameter group may include K compression parameters.

In some embodiments, the compression ratio corresponding to the compression parameter table may be 1.2, 1.5, 2, 3, or 4, or the like, or any other real number. These five types of compression ratio may be generated based on relevant principles and the corresponding compression ratio. The relevant principles may include an information theory, a numerical method, an experimental adjustment, a spline method, a cubic interpolation method, a linear interpolation method, a nearest interpolation method, a simulation experiment, a mixed interpolation method, or the like, or any combination thereof. For example, the principle of the compression ratio for 1.2 may be based on the spline method. The principle of the compression ratio for 1.5 may be based on the cubic interpolation method. The principle of the compression ratio for 2 may be based on the linear interpolation method. The principle of the compression ratio for 3 may be based on the linear interpolation method. The principle of the compression ratio for 4 may be based on the mixed interpolation method of the linear interpolation method and the nearest interpolation method. The optimal compression ratio may be modified or further adjusted by simulation experiment.

In some embodiments, a compression table may include N compression parameter group(s). In some embodiments, a compression parameter group may include K compression parameter(s), and K may be equal to the number of tap(s) of a filter. N may be determined according to equation (4). In some embodiments, if the compression ratio acquired is different from the compression ratios preset in the system, a first compression ratio and a second compression ratio may be selected from the preset compression ratios. The first compression ratio may be a compression ratio less than and closest to the compression ratio acquired. The second compression ratio may be a compression ratio greater than and closest to the compression ratio acquired. A first candidate compression parameter table may be determined based on the first compression ratio. A second candidate compression parameter table may be determined based on the second compression ratio. A third compression parameter table may be determined based on the first compression parameter table and the second compression parameter table. For example, the third compression parameter table may be calculated according to an equation $P_{zm}(k)=P_{zs}(k) \times W_{zs}+P_{zl}(k) \times W_{zl}$, wherein $P_{zm}(k)$ may be a third compression parameter k in the compression parameter table, $P_{zs}(k)$ may be a compression parameter k in the first candidate compression parameter table, $P_{zl}(k)$ may be a compression parameter k in the second candidate compression parameterable, and $W_{zs}$ and $W_{zl}$ may be weight factors.

In some embodiments, compression parameter group determination unit 904 may be configured to determine a compression parameter group for one of M image data sets, based on the compression ratio and the corresponding compression parameter table. For example, if an image data set is compressed into ith row or ith column (i may satisfy a mathematical relationship (39)), the first compression parameter group may be determined based on the compression parameter table. And, if an image data set is compressed into ith row or ith column (i may satisfy a mathematical relationship (40)), the last compression parameter group may be determined based on the compression parameter table. And, if an image data set is compressed into ith row or ith column (i may satisfy a mathematical relationship (41)), compression parameter group S (S may be determined according to equation (38)) and compression parameter group S+1 may be determined, and a new compression parameter group may be generated according to equation (42). The generated compression parameter group may be determined as the compression parameter group for a corresponding data set.

In some embodiments, compression pressing unit 905 may compress the image data acquired from image data acquisition engine 210, based on M image data sets, and compression ratio. The compressed image data may generate a compressed image.

Referring FIG. 9-B, image scaling apparatus 900 may include a hardware component 911, and a software component 912. In some embodiments, hardware component 911 may include a smoothing filter 913, an interpolation filter 914. Software component 912 may include a first configuration parameter 915 and a second configuration parameter 916. The first configuration parameter may be dynamically produced for smoothing filter 913 with 5 taps. And the second configuration parameter may be fixed for the interpolation filter 914 with 4 taps.

In some embodiments, smoothing filter 913 may be configured to smooth a data set. In some embodiments, smoothing filter 913 may include an additive smoothing filter, a butterworth filter, an exponential smoothing filter, a Kalman filter, a Kernel smoother, a Kolmogorov-Zurbenko filter, a Laplacian smoothing filter, a Ramer-Douglas-Peucker algorithm filter, a Savitzky-Golay smoothing filter or the like, or any combination thereof. In some embodiments, smoothing filter 913 may include 5 taps. Smoothing filter 913 with 5 taps may need 4-line buffer.

In some embodiments, interpolation filter 914 may include a nearest-neighbor interpolation filter, a linear interpolation filter, a polynomial interpolation filter, a spline interpolation filter, a rational interpolation filter, a trigonometric interpolation filter, a multivariate interpolation filter (e.g., a bilinear interpolation filter, a bicubic interpolation filter, a trilinear interpolation filter), or the like, or any combination thereof. In some embodiments, interpolation filter 914 may include 4 taps. Interpolation filter 914 with 4 taps may need 3 line buffer.

Figure 10:
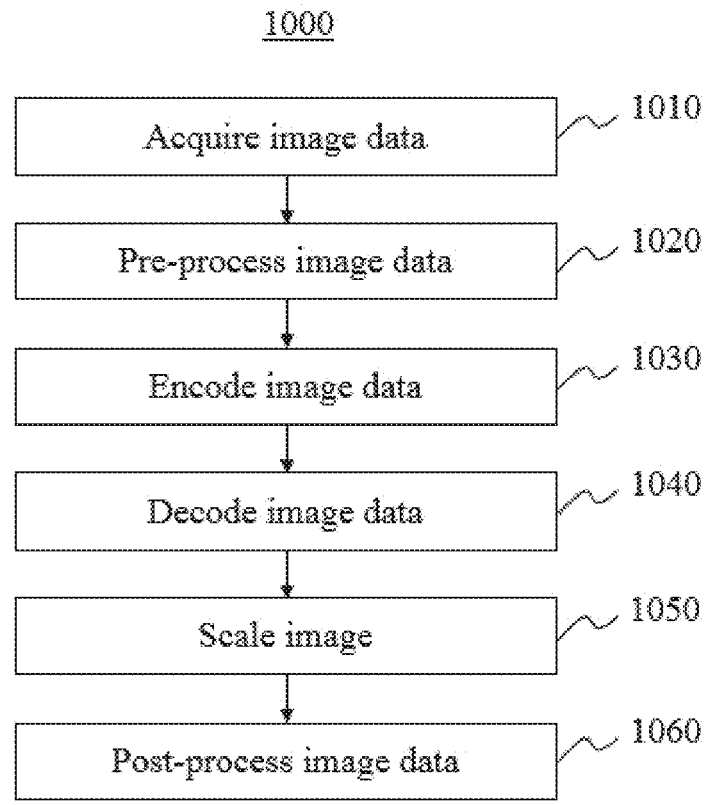
FIG. 10 is a flowchart of an exemplary process for processing an image according to some embodiments of the present disclosure.

Referring to FIG. 10, an exemplary process of image processing may include acquiring image data, pre-processing image data, encoding image data, decoding image data, scaling image and post-processing image data. One or more algorithms may be employed in image processing.

At 1010, image data acquisition engine 210 may acquire image data. In some embodiments, the image data may include color image data, CFA image data, Bayer image data, digital image data, or analog image data, or the like, or any combination thereof. In some embodiments, the image data may be acquired from image capture device 120, storage 130, display device 140, or an external storage device, or other device capable of generating data, or the like, or any combination thereof. In some embodiments, the image data acquired may be further used at steps 1020, 1030, 1040, 1050, and/or 1060, or any combination thereof.

At 1020, image pre-processing engine 220 may pre-process the image data acquired at 1010. In some embodiments, operations performed at 1020 may include a rendering, a fusion, a clipping, a binaryzation, an enhancement, or the like, or any combination thereof. In some embodiments, the rendering may add data to the image data acquired at 1010. The added data may include bitmap texture, procedural texture, light, bump mapping, etc. The rendering may employ an algorithm including a shading, a texture-mapping, a bump-mapping, a fogging/participation medium, a reflection, a transparency, a translucency, a refraction, a diffraction, an indirect illumination, a caustics, a depth of field, a motion blur, a non-photorealistic rendering, or the like, or any combination thereof. In some embodiments, the fusion may be based on an algorithm including, for example, Fourier slice theorem, filtered back projection algorithm, fan-beam reconstruction, iterative reconstruction, or the like, or any combination thereof. In some embodiments, the image data pre-processed at 1020 may be further used at steps 1030, 1040, 1050, and/or 1060, or any combination thereof.

At 1030, image encoding engine 230 may encode the image data acquired at 1010, image data scaled at 1050, and/or image data post-processed at 1060. In some embodiments, image encoding process may include subsampling or downsampling. The downsampling may include a discrete cosine transform (DCT), a wavelet transformation, a quantization, an entropy encoding, or a compression, or any data transformation, or the like, or any combination thereof. In some embodiments, a method for encoding may be employed at 1030. The method may include an H.265/MPEG-H HEVC, an H.264/MPEG-4 AVC, an H.263/MPEG-4 Part 2, an H.262/MPEG-2, a Microsoft (e.g., Windows Media Video, MS MPEG-4v3), a Google On2, an Apple ProRes, a DNxHD, or an Indeo, a motion JPEG, a motion JPEG 2000, a FFmpeg, a 3ivx, Div X, an Xvid, or the like, or any combination thereof. In some embodiments, the data may be encoded based on a coding mode, including an unary coding, an arithmetic coding, Golornb coding, Huffman coding, adaptive coding, canonical coding, modified coding, range coding, Shannon coding, Shannon-Fano coding, Shannon-Fano-Elias coding, tunstall coding, universal coding (e.g., Exp-Golomb coding, Fibonacci coding, Gamma coding, Levenshtein coding). In some embodiments, the image data may be encoded using a chain code, a discrete cosine transform, a Fractal compression, an Embedded Zerotrees of Wavelet transforms (EZW), a Karhunen-Loeve theorem, a pyramid representation, a Run-length encoding (RLE), a Set partitioning in hierarchical trees (SPIHT), or a Wavelet compression, or the like, or any combination thereof.

In some embodiments, a code stream may be generated at 1030. In some embodiments, the code stream may be processed by a programming language including Java, Scala, Smalltalk, Eiffel, JADE, Emerald, C++, C#, VB.NET, Python or the like, "C" programming language, Visual Basic, Fortran 2003, Perl, COBOL 2002, PHP, ABAP, Python, Ruby and Groovy, or other programming languages, or the like, or any combination thereof. In some embodiments, a header may be generated at 1030. In some embodiments, the encoded image data may be further used at steps 1040, 1050, and/or 1060, or any combination thereof.

At 1040, image decoding engine 240 may decode the image data encoded at 1030 based on the code stream generated at 1030. In some embodiments, image decoding may be an inverse process of image encoding performed at 1030. In some embodiments, image data may be decoded based on the header generated at 1030. In some embodiments, the decoded image data may be further used at steps 1020, 1050, and/or 1060, or any combination thereof.

At 1050, image scaling engine 250 may scale the image data acquired at 1010, image data pre-processed at 1020, and/or image data post-processed at 1060. In some embodiments, an algorithm may be employed, including, a Nearest-neighbor interpolation, a Bilinear and bicubic algorithms, a Sinc and Lanczos resampling, a Box sampling, Mipmap, a Fourier transform methods, an Edge-directed interpolation, a Vectorization, an hqx, or the like, or any combination thereof. In some embodiments, operations may be performed, including, smoothing and/or interpolation. In some embodiments, the scaled image may be further used at steps 1020, 1030, and/or 1060, or any combination thereof.

At 1060, image post-processing engine 260 may post-process the image data acquired at 1010, image data pre-processed at 1020, image data encoded at 1030, image data decoded at 1040, and/or image data scaled at 1050. In some embodiments, post-processing may include a rendering, a fusion, a clipping, a binaryzation, an enhancement, or the like, or any combination thereof. In some embodiments, the post-processed data may be adjusted by the image processing system 110 or by a user. The adjustment may include an enhancement of the image data, an adjustment of region of interest, or the like, or any combination thereof. In some embodiments, the post-processed data may be used in applications including target acquisition, surveillance, night vision, homing, tracking, thermal efficiency analysis, environmental monitoring, industrial facility inspections, remote temperature sensing, short-ranged wireless communication, spectroscopy, weather forecasting, observation of blood flow in the skin, or the like, or any combination thereof. In some embodiments, the post-processed data may be further used at steps 1030, 1040, and/or 1050, or any combination thereof.

Figure 11:
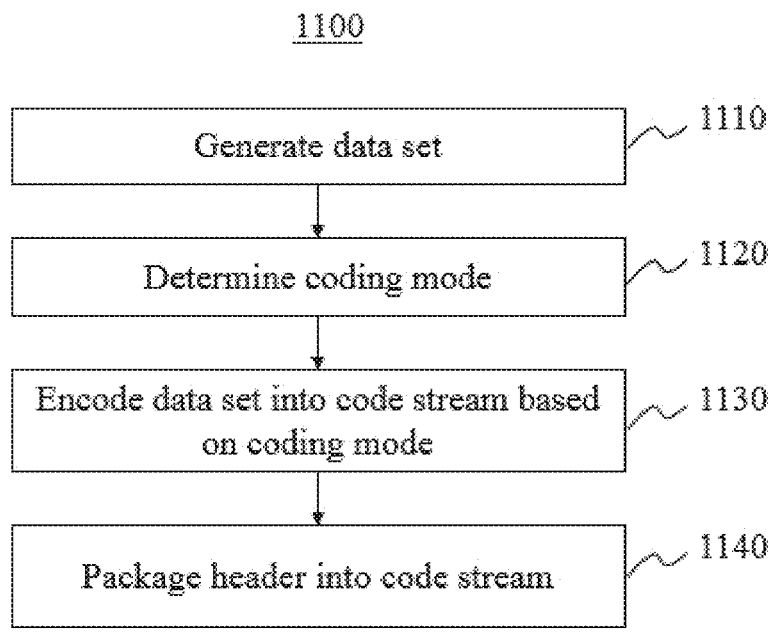
FIG. 11 is a flowchart of an exemplary process for encoding an image according to some embodiments of the present disclosure.

In some embodiments, step 1030 of process 1000 may be performed based on an exemplary process 1100 shown in FIG. 11. At 1110, data set generation module 310 may generate a plurality of data sets based on the image data acquired at 1010, image data pre-processed at 1020, image data scaled at 1050, or image data post-processed at 1060. In some embodiments, the data sets generated at 1110 may include a first-level data set, a second-level data set, and/or a third-level data set.

In some embodiments, the data set may be generated based on an exemplary process 1200 shown in FIG. 12-A. At 1201, first-level data set generation unit 410 may generate one or more first-level data sets based on the image data acquired at 1010, image data pre-processed at 1020, image data scaled at 1050, or image data post-processed at 1060. A first-level data set may be generated based on a pixel group (e.g., a row of pixels, a column of pixels, and/or a matrix of pixels) in an image. In some embodiments, a first-level data set may include one or more pixel value components according to the color space of an image. Merely by way of example, a pixel value of a YCbCr image may include a luma component, a blue-difference chroma component, and a red-difference chroma component. The first-level data set generated from a YCbCr image may be expressed as a set of $[(V_{11}, V_{12}, V_{13}), \ldots, (V_{i1}, V_{i2}, V_{i3}), \ldots, (V_{N1}, V_{N2}, V_{N3})]$, or any variation of the set, wherein $V_{i1}$, $V_{i2}$, and $V_{i3}$ (i may be an integer, $N \geq i \leq 1$) may respectively refer to the luma component value, the blue-difference chroma component value, and the red-difference chroma component value of ith pixel in pixel group. In some embodiments, one or more pixel values may be transformed during, before, or after first-level data set generation. The transformation of pixel value may be realized by using one or more transformation functions. The transformation function may include a power function, an exponential function, a logarithmic function, a trigonometric function, an inverse trigonometric function, or the like, or any combination thereof.

At 1202, second-level data set generation unit 420 may generate one or more second-level data sets based on the first-level data set(s). In some embodiments, the first-level data set(s) may be generated at 1201. In some embodiments, a second-level data set may be generated from the same pixel component in the first-level data set. Merely by way of example, supposing a first-level data set $[(V_{11}, V_{12}, V_{13}), \ldots, (V_{i1}, V_{i2}, V_{i3}), \ldots, (V_{N1}, V_{N2}, V_{N3})]$ may be generated from a YCbCr image, a second-level data set Y may be generated from the luma component value(s) therein, e.g., $(V_{11}, \ldots, V_{i1}, \ldots, V_{N1})$; a second-level data set Cb may be generated from the blue-difference chroma component value(s) therein, e.g., $(V_{12}, \ldots, V_{i2}, \ldots, V_{N2})$; a second-level data set Cr may be generated from the red-difference chroma component value(s) therein, e.g., $(V_{13}, \ldots, V_{i3}, \ldots, V_{N3})$. In some embodiments, one or more component values may be transformed during, before, or after second-level data set generation. The transformation of component value may be realized by using one or more transformation functions. The transformation function may include a function listed elsewhere in the present disclosure, or any variations thereof.

In some embodiments, one or more second-level data sets generated at 1202 may be undersampled, and the second-level data set(s) generated from the same first-level data set may have different sizes. For example, for a YCbCr 4:2:0 image, the second-level data set Y may have a size of 16×4; the second-level data set Cb may have a size of 8×2; the second-level data set Cr may have a size of 8×2. As another example, for a YCbCr 4:2:2 image, the second-level data set Y may have a size of 8×4; the second-level data set Cb may have a size of 4×4; the second-level data set Cr may have a size of 4×4.

At 1203, second-level data set generation unit 420 or third-level data set generation unit 430 may determine residual value(s) for the second-level data set(s). In some embodiments, the second-level data set(s) may be generated at 1202. In some embodiments, an element of the second-level data set may have a corresponding residual value. A residual value may refer to the difference between an element and a reference value. A reference value may be an element of the second-level data set(s), a fixed value, a functional value of an element, or the like, or any combination thereof. In some embodiments, different elements may have different reference values. In some embodiments, one or more seed elements may be determined for residual value determination. In some embodiments, residual values may be determined with different methods for different second-level data sets.

For the second-level data set Y, a seed element may be determined as the element at (row M, column N) of the data matrix, wherein M and N may be integers. In some embodiments, the residual value of the seed element may be determined as the luma component value of the seed element. In some embodiments, for an element at the same row (row M) with the seed element, the residual value may be calculated as equation (5):

$$e_Y(M,l)=I_Y(M,l)-I_Y(M,l-1), \quad (5)$$

wherein l may be an integer, Y may represent luma component, $e_Y(M,l)$ may refer to the residual value of element at (row M, column l), $I_Y(M,l)$ may refer to the luma component value of the element at (row M, column l), and $I_Y(M,l-1)$ may refer to the luma component value of the element at (row M, column l-1).

In some embodiments, for an element at the same column (column N) with the seed element, the residual value may be calculated according to equation (6):

$$e_Y(r,N)=I_Y(r,N)-I_Y(r-1,N), \quad (6)$$

wherein r may be an integer, $e_Y(r, N)$ may refer to the residual value of element at (row r, column N), $I_Y(r,N)$ may refer to the luma component value of the element at (row r, column N), and $I_Y(r-1,N)$ may refer to the luma component value of the element at (row r-1, column N).

In some embodiments, for an element at different rows and different columns with the seed element, the residual value may be calculated according to equation (7):

$$e_Y(m,n) = I_Y(m,n) - \frac{(I_Y(m-1,n) + I_Y(m,n-1))}{2}, \quad (7)$$

wherein m and n may be integers, m may be different from M, and n may be different from N.

For the second-level data set Cb or the second-level data set Cr, a seed element may be determined as the element at (row M', column N') of the data matrix, wherein M' and N' may be integers. M' may be the same as (or different from) M, and N' may be the same as (or different from) N. In some embodiments, the reference value of the seed element may be determined as a fixed value $V_F$ (e.g., 128). In some embodiments, the residual value of the seed element may be calculated according to equation (8):

$$e(M',N')=I(M',N')-V_F, \quad (8)$$

wherein e(M',N') may refer to the residual value of element at (row M', column N'), and I(M',N') may refer to a chroma component (e.g., blue-difference chroma component, or red-difference chroma component) value of the element at (row M', column N').

In some embodiments, for an element at the same row (row M') with the seed element, the residual value may be calculated according to equation (9):

$$e(M',l)=I(M',l)-I(M',l-1), \quad (9)$$

wherein e(M',l) may refer to the residual value of element at (row M', column l), I(M',l) may refer to the chroma component (e.g., blue-difference chroma component, or red-difference chroma component) value of the element at (row M', column l), and I(M',l-1) may refer to the chroma component (e.g., blue-difference chroma component, or red-difference chroma component) value of the element at (row M', column l-1).

In some embodiments, for an element at the same column (column N') with the seed element, the residual value may be calculated according to equation (10):

$$e(r,N')=I(r,N')-I(r-1,N'), \quad (10)$$

where e(r, N') may refer to the residual value of element at (row column N'), I(r,N') may refer to the chroma component (e.g., blue-difference chroma component, or red-difference chroma component) value of the element at (row r, column N'), and I(r-1,N') may refer to the chroma component (e.g., blue-difference chroma component, or red-difference chroma component) value of the element at (row r-1, column N').

In some embodiments, for an element at different rows and different columns with the seed element, the residual value may be calculated according to equation (11):

$$e(m,n) = I(m,n) - \frac{(I(m-1,n) + I(m,n-1))}{2}, \quad (11)$$

wherein m and n may be integers, m may be different from M', n may be different from N', and I may refer to the chroma component (e.g., blue-difference chroma component, or red-difference chroma component) value.

It should be noted that equations (1) through (7) are merely for exemplary purposes, they should not be understood as the only embodiment. For example, the residual value of an element may be determined based on one or more adjacent elements of the element.

At 1204, second-level data set generation unit 420 or third-level data set generation unit 430 may generate a residual image. In some embodiments, the residual image may be generated based on residual value(s) determined at 1203. The residual value(s) may include the second-level data set Y, the second-level data set Cb, and/or the second-level data set Cr. In some embodiments, the residual value(s) may be arranged, and a data matrix representing the residual image may be generated. In some embodiments, the residual value(s) may be arranged based on a predetermined arrangement rule. The predetermined arrangement rule may include which residual values may be arranged, the arrangement order of the residual value(s), the size of the data matrix representing residual image, or the like, or any combination thereof.

At 1205, third-level data set generation unit 430 may generate one or more third-level data sets. In some embodiments, third-level data set(s) may be generated based on the residual image generated at 1204. In some embodiments, a third-level data set may refer to a layer image of the residual image. In some embodiments, third-level data set generation unit 430 may transform the residual image before generating the third-level data set. The transformation may include mapping a residual value in the residual image to a non-negative integer in a specified range, transforming the mapped residual value to a binary number with certain bits, and partitioning the binary number.

In some embodiments, the residual value(s) may be mapped. In some embodiments, if a residual value is represented by a number with 8 bits, the residual value may be within the range of −255 to 255. In some embodiments, a residual value may be mapped to an integer within the range of 0 to 510 according to equation (12):

$$e' = \begin{cases} 2e & e \geq 0 \\ 2|e|-1 & e < 0 \end{cases}, \quad (12)$$

wherein e may represent a residual value before mapping, and e' may represent the mapped residual value.

In some embodiments, the mapped residual value may be converted to a binary number with certain bits. In some embodiments, a number with 8 bits may cover the range of −255 to 255. In some embodiments, a number with 9 bits may be necessary to cover the range of 0 to 510. In some embodiments, the mapped residual value may be converted from 8 bits to 9 bits. In some embodiments, the conversion may be realized through adding a bit to the mapped residual value. In some embodiments, the bit to be added may have a binary value of 0 or 1. In some embodiments, the bit may be added next to any bit among the existing 8 bits.

In some embodiments, the mapped and/or converted residual value may be partitioned into N portions, wherein N may be an integer, N≥1. In some embodiments, one or more bits of a residual value may be extracted to form a portion. In some embodiments, a plurality of portions of one or more residual values may be arranged to form a layer image. Merely by way of example, a residual value with 9 bits may be partitioned into 3 portions. Each portion may have 3 bits respectively (e.g., bits 0, 1, and 2 may form portion 1, bits 3, and 5 may form portion 2, and bits 6, 7, and 8 may form portion 3). Further, portion 1 of one or more residual values in the residual image may form a layer image $L_0$, and portion N of one or more residual values in the residual image may form a layer image $L_{N-1}$. In some embodiments, $L_0, L_1, L_2, \ldots$, or $L_{N-1}$ may be a data matrix. In some embodiments, a layer image (e.g., $L_0, L_1, L_2, \ldots$, or $L_{N-1}$) may be obtained as a third-level data set. Thus, N third-level data sets may be obtained. In some embodiments, N may be 3, and the layer images $L_0, L_1$, and $L_2$ may be determined according to equations (13), (14), and (15):

$$L_0(m,n) = e'(m,n) \bmod 8, \quad (13)$$

$$L_1(m,n) = (e'(m,n) >> 3) \bmod 8, \quad (14)$$

$$L_2(m,n) = e'(m,n) >> 6, \quad (15)$$

wherein $L_0(m,n)$ may refer to the element at (row m, column n) in layer image $L_0$, $L_1(m,n)$ may refer to the element at (row m, column n) in layer image $L_1$, $L_2(m,n)$ may refer to the element at (row m, column n) in layer image $L_2$, e'(m,n) may refer to the element at (row m, column n) in residual image, "mod" may represent modulo operator, and ">>" may represent right shift operator.

Figure 13:
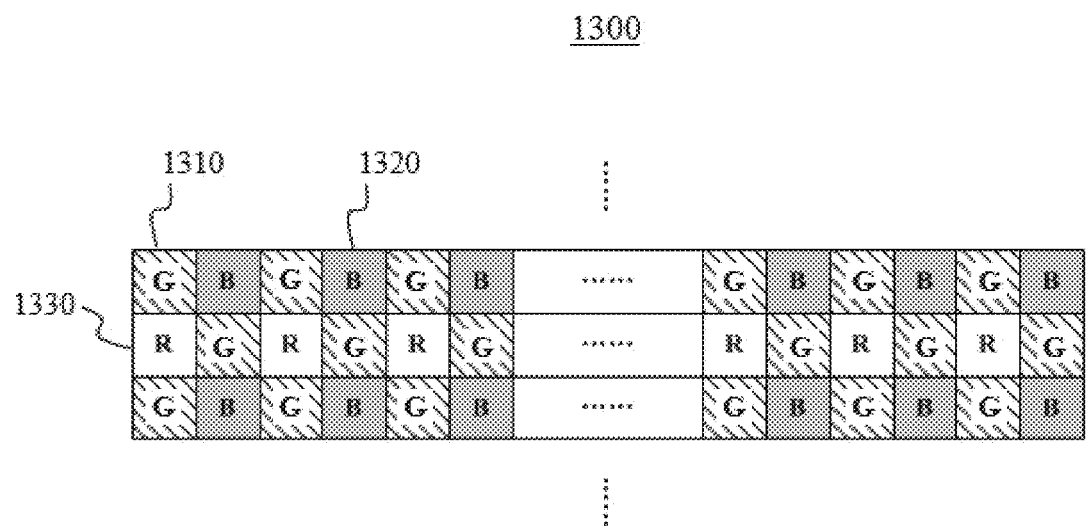
FIG. 13 is a schematic diagram illustrating a Bayer color filter array pattern according to some embodiments of the present disclosure.

Referring back to FIG. 11, at 1110, in some embodiments, data set may be generated based on another exemplary process 1210 shown in FIG. 12-B. At 1211, first-level data set generation unit 410 may generate one or more first-level data sets. In some embodiments, first-level data set(s) may be generated based on a color filter array image. The chroma components of different pixels may be different according to the color filter array pattern of the image. In some embodiments, the image may have a Bayer color filter array pattern 1300 shown in FIG. 13. The image may have three chroma components, including, a red chroma component, a green chroma component, and a blue chroma component. In some embodiments, a pixel may have one chroma component, and a row or column of pixels may have two chroma components. The two chroma components of pixels in a row may be arranged alternately. The two chroma components of pixels in a column may be arranged alternately. For example, pixel 1310 may have a green chroma component, pixel 1320 may have a blue chroma component, and pixel 1330 may have a blue chroma component. In some embodiments, a first-level data set may be generated based on a pixel group (e.g., a row of pixels in a color filter array image). For example, in the row of pixel 1310, one or more pixels with green chroma component may be extracted and form a first chroma component data set; one or more pixels with blue chroma component may be extracted and form a second chroma component data set. As another example, in the row of pixel 1330, one or more pixels with green chroma component may be extracted and form a first chroma component data set; one or more pixels with red chroma component may be extracted and form a second chroma component data set. In some embodiments, if a row of the image has SUM pixels, for 2x pixels (x may be an integer, x≥1, SUM≥2x) therein, x pixels at odd positions may be extracted to form a first chroma component data set, and x pixels at even positions may be extracted to form a second chroma component data set. In some embodiments, the first and second chroma component data sets may be arranged and form a first-level data set.

At 1212, second-level data set generation unit 420 may generate a first second-level data set. In some embodiments, the first second-level data set may be generated based on the first-level data set generated at 1211. In some embodiments, the first second-level data set may be generated based on one or more transformation process, including, two dimension discrete cosine transform (2D DCT), and/or quantization process. In some embodiments, transformation may be based on one or more transformation matrix. In some embodiments, transformation coefficient(s) may be generated through transformation, and transformation coefficient(s) generated may form the first second-level data set. An exemplary 2D DCT transformation process may be illustrated below.

First, a matrix of transformation coefficients may be generated according to equation (16):

$$X' = AX^T, \quad (16)$$

wherein X may represent a first-level data set, T may represent transpose operation, X' may represent the transpose matrix of X, and A may represent a transformation matrix. In some embodiments, the size of A may be related with the size of X. For example, for an 8×8 matrix X, A may be an 8×8 matrix. An exemplary matrix for A may be illustrated as follows:

$$A = \begin{bmatrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 36 & -83 & 83 & -36 & -36 & 83 & -83 & 36 \\ 18 & -50 & 75 & -89 & 89 & -75 & 50 & -18 \end{bmatrix}.$$

Second, one or more transformation coefficients in X' may be modified according to equation (17):

$$X'_{i,j} = (X'_{i,j} + r_1) >> (M-1+B-8), \tag{17}$$

wherein M=$\log_2$N, N may represent the size of the first-level data set, B may represent the bit depth in calculation, and $r_1$ may be a rounding parameter. In some embodiments, for an 8×8 matrix X', N may be 8, and M may be 3. In some embodiments, B may be 8. In some embodiments, $r_1$ may be expressed as $r_1 = 1 << (M-2+B-8)$, wherein "<<" may represent left shift operator.

Third, another matrix Y of transformation coefficients may be generated according to equation (18):

$$Y = AX'^T, \tag{18}$$

wherein $X'^T$ may represent the transpose matrix of X'. In some embodiments, one or more transformation coefficients in Y may be modified according to equation (19):

$$Y_{i,j} = (Y_{i,j} + r_2) >> (M+6), \tag{19}$$

wherein $r_2$ may be a rounding parameter. In some embodiments, $r_2$ may be expressed as $r_2 = 1 << (M+5)$.

In some embodiments, modified transformation coefficients may be quantized according to equation (20):

$$Z_{i,j} = (Y_{i,j} \times q + r_3) >> \left(21 + \frac{Q}{6} - M - (B-8)\right), \tag{20}$$

wherein Z may be the quantized matrix of transformation coefficients, Q may be a parameter for controlling the range of quantized transformation coefficients, q may be a factor related with Q, and $r_3$ may be a rounding parameter. In some embodiments, q may be determined according to Table 1 shown below. In some embodiments, Q may be related with the bit depth in the calculation. For example, supposing the bit depth may be 12, Q may be set as 29≤Q≤36. As another example, supposing the bit depth may be 16, Q may be set as 32≤Q≤39. In some embodiments, $r_3$ may be expressed as $r_3 = 85 << (21+Q/6-M-(B-8)-9)$. In some embodiments, Z may be obtained as a first second-level data set.

TABLE 1

| Relationship between Q and factors q, p | | | | | | |
|---|---|---|---|---|---|---|
| Q mod 6 | 0 | 1 | 2 | 3 | 4 | 5 |
| q | 26214 | 23302 | 20560 | 18396 | 16384 | 14564 |
| p | 40 | 45 | 51 | 57 | 64 | 72 |

At 1213, second-level data set generation unit 420 may generate a second second-level data set. In some embodiments, the second second-level data set may be generated based on the first second-level data set generated at 1212. In some embodiments, the second second-level data set may be generated based on one or more inverse transformation process, including, inverse two dimension discrete cosine transform (2-D DCT), and/or inverse quantization process. In some embodiments, the second second-level data set may represent a set of residual values. An exemplary inverse transformation process may be illustrated below.

Firstly, an inverse quantization process may be performed according to equation (21):

$$U_{i,j} = \left(\left(Z_{i,j} \times \left(p << \frac{Q}{6}\right)0 + (1 << (M-2+B-8))\right) >> (M-1+B-8), \tag{21}$$

wherein p may be a factor related with Q. In some embodiments, p may be determined according to Table 1 shown above.

Secondly, an inverse 2D DCT process may be performed. A matrix U' of transformation coefficients may be calculated according to equation (22):

$$U' = A^T U, \tag{22}$$

wherein $A^T$ may represent the transpose matrix of A. Then the matrix U' may be modified according to equation (23):

$$U'_{i,j} = (Y'_{i,j} + (1<<6)) >> 7. \tag{23}$$

In some embodiments, a matrix V of transformation coefficients may be determined according to equation (24):

$$V = U'A. \tag{24}$$

In some embodiments, the matrix V may be modified according to equation (25):

$$I'_{i,j} = (V_{i,j} + (1<<(11-(B-8)))) >> (12-(B-8)), \tag{25}$$

wherein I may refer to a matrix representing original pixel values of an image, and I' may refer to a matrix representing predicted pixel values of the image. In some embodiments, a matrix E representing residual pixel values of the image may be determined according to equation (26):

$$E_{i,j} = I_{i,j} - I'_{i,j}. \tag{26}$$

In some embodiments, the matrix E may be obtained as a second second-level data set.

At 1214, third-level data set generation unit 430 may generate a plurality of third-level data sets. In some embodiments, third-level data sets may be generated based on the first second-level data set generated at 1212. In some embodiments, the first second-level data set may be mapped. In some embodiments, the first second-level data set may include one or more direct component values of transformation coefficients. In some embodiments, the first second-level data set may include a direct component for green chroma (DCGC), and a direct component for red/blue chroma (DCRC/DCBC). In some embodiments, one or more direct component values in the first second-level data set may be excluded from mapping. In some embodiments, the direct component values may be further excluded from encoding.

In some embodiments, the first second-level data set (excluding the direct component values) may be mapped according to equation (27):

$$g = \begin{cases} 2f & f \geq 0 \\ 2|f|-1 & f < 0 \end{cases}, \tag{27}$$

wherein f may represent values before mapping, and g may represent values after mapping.

In some embodiments, the mapped first second-level data set may be partitioned into N portions, wherein N may be an integer, N≥1 In some embodiments, one or more bits of a value may be extracted to form a portion. In some embodiments, a plurality of portions of one or more values may be arranged to form a layer image. Merely by way of example, an x bits value may be partitioned into 3 portions, with each portion has one or more bits (e.g., bits 0~$a_1$ may form portion 1, bits ($a_1$+1)~$a_2$ may form portion 2, and bits ($a_2$+1)~x may form portion 3, wherein $a_1$ and $a_2$ may be integers, 0≤$a_1$≤$a_2$≤x). Further, portion 1 of one or more values in the first second-level data set may form a layer image $L_0$, and portion N of one or more values in the first second-level data set may form a layer image $L_{N-1}$. In some embodiments, $L_0, L_1, L_2, \ldots$, or $L_{N-1}$ may be a data matrix. In some embodiments, one layer image (e.g., $L_0, L_1, L_2, \ldots$, or $L_{N-1}$) may be obtained as one third-level data set. Thus, N third-level data sets may be obtained. In some embodiments, N may be 3, and the layer images $L_0, L_1, L_2$ may be determined according to equations (28), (29), and (30):

$$L_0(m,n)=g(m,n) \bmod 2^{b0}, \quad (28)$$

$$L_1(m,n)=(g(m,n)>>b0) \bmod 2^{b1}, \quad (29)$$

$$L_2(m,n)=g(m,n)>>(b0+b1), \quad (30)$$

wherein $b_0$, and $b_1$ may be real numbers.

In some embodiments, for a color filter array image with bit depth of 12, the values of first second-level data set may be in the range of [0, $2^{13}-1$], $b_0$ in equations (28), (29), and (30) may be 4, and $b_1$ in equations (29) and (30) may be 4. In some embodiments, for a color filter array image with bit depth of 16, the values of first second-level data set may be in the range of [0, $2^{17}-1$], $b_0$ in equations (28), (29), and (30) may be 5, and $b_1$ in equations (29) and (30) may be 6.

At 1215, third-level data set generation unit 430 may generate a plurality of third-level data sets. In some embodiments, third-level data sets may be generated based on the second second-level data set generated at 1213. In some embodiments, the second second-level data set may be mapped. The mapping process may be performed according to equation (27). It should be noted that no direct component may be excluded from the second second-level data set for mapping. In some embodiments, N' layer images (or third-level data sets) may be generated based on similar methods used at 1214. In some embodiments, the number N of layer images generated from the first second-level data set and the number N' of layer images generated from the second second-level data set may be the same or not.

Figure 14:
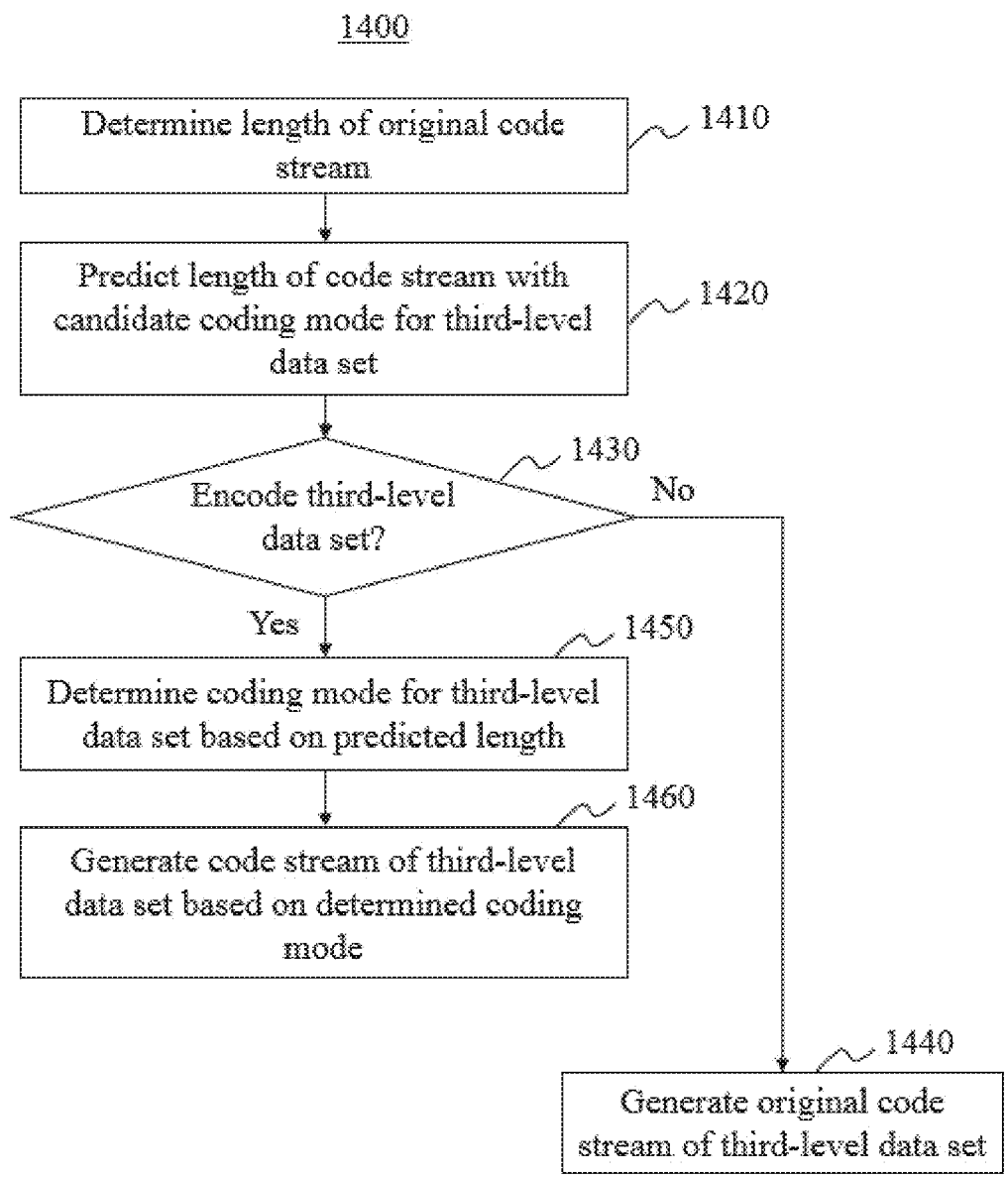
FIG. 14 is a flowchart of an exemplary process for determining a coding mode and generating a code stream according to some embodiments of the present disclosure.

Referring back to FIG. 11, at 1120, coding mode determination module 320 may determine one or more coding modes for a third-level data set. At 1130, code stream generation module 330 may generate one or more code streams based on the coding mode(s) determined at 1120. In some embodiments, a coding mode may be determined and a code stream may be generated according to an exemplary process 1400 shown in FIG. 14.

At 1410, coding mode determination module 320 may determine the length of an original code stream for a third-level data set. In some embodiments, an original code stream may refer to the code stream of the third-level data set without encoding. For example, if an element of the third-level data set is expressed by an x bit binary number, the third-level data set may be expressed by n (n may refer to the number of elements in the third-level data set) binary numbers with each binary number having x bits. Accordingly, the original code stream of the third-level data set may have xn bits (i.e., the length of the original code stream may be xn).

At 1420, coding mode determination module 320 may predict the length of code stream(s) corresponding to candidate coding mode(s) for the third-level data set. In some embodiments, the length of a code stream may refer to the number of bits or bytes of the code stream. In some embodiments, candidate coding modes may include lossy image encoding modes, and/or lossless image encoding modes. In some embodiments, lossy image encoding modes may include chroma subsampling, transform coding, fractal compression, or the like, or any combination thereof. In some embodiments, lossless image encoding modes may include run-length coding, Huffman coding, predictive coding, entropy encoding (e.g., order-k exponential. Golomb coding), fixed-length encoding, adaptive dictionary algorithms (e.g., Lempcl-Ziv-Welch (LZW)), deflation, arithmetic coding, or the like, or any combination thereof. In some embodiments, a third-level data set may be not necessarily encoded with one or more candidate coding modes, and one or more code streams may be not necessarily generated. In some embodiments, length of the code stream(s) may be predicted without encoding the third-level data set. An exemplary prediction process may be illustrated below.

In some embodiments, Huffman coding may be used as a candidate coding mode. In some embodiments, the prediction may be based on a Huffman coding table shown in Table 2.

TABLE 2

Huffman coding table

| data | coding table 0 | | coding table 1 | | coding table 2 | | coding table 3 | | coding table 4 | | coding table 5 | |
|---|---|---|---|---|---|---|---|---|---|---|---|---|
| | length | code | length | code | length | code | length | code | length | code | length | code |
| 0 | 1 | 0 | 1 | 0 | 1 | 0 | 2 | 0 | 2 | 0 | 3 | 4 |
| 1 | 2 | 2 | 2 | 2 | 3 | 4 | 2 | 1 | 2 | 1 | 1 | 0 |
| 2 | 4 | 12 | 3 | 6 | 3 | 5 | 2 | 2 | 3 | 4 | 3 | 5 |
| 3 | 4 | 13 | 4 | 14 | 4 | 12 | 4 | 12 | 3 | 5 | 4 | 12 |
| 4 | 5 | 28 | 6 | 60 | 4 | 13 | 4 | 13 | 4 | 12 | 4 | 13 |
| 5 | 5 | 29 | 6 | 61 | 4 | 14 | 4 | 14 | 4 | 13 | 4 | 14 |
| 6 | 5 | 30 | 6 | 62 | 5 | 30 | 5 | 30 | 4 | 14 | 5 | 30 |
| 7 | 5 | 31 | 6 | 63 | 5 | 31 | 5 | 31 | 4 | 15 | 5 | 31 |

In some embodiments, Huffman coding may be realized based on 6 coding tables according to Table 2. In some embodiments, the same data may have different code lengths and different code streams in different coding tables. Merely by way of example, a number "5" may correspond to a five bit binary number 11101 according to coding table 0. As another example, the number "5" may correspond to a four bit binary number 1101 according to coding table 1. In some embodiments, a histogram H may be determined based on the third-level data set. In some embodiments, the length of code stream may be predicted according to equation (31):

$$L_k = \sum_{i=0}^{S} H(i)M_k(i), \qquad (31)$$

wherein L may represent the length of code stream for all elements of third-level data set; $L_k$ may represent the length determined based on kth (k may be an integer, 0≤k≤5) coding table in Table 2; i may be an integer, 0≤i≤S; S may refer to a maximum value for an element of the third-level data set; H(i) may represent the number of elements which may have value i in the third-level data set; and $M_k(i)$ may represent the length of data i in coding table $M_k$. In some embodiments, $M_k$ may be one of the coding tables shown in Table 2. In some embodiments, S may be determined as $S=2^b-1$, wherein "b" may represent the number of bits for an element of the third-level data set. For example, if an element of the third-level data set is a 3-bit number, S may be 7 (i.e., $2^3-1$). In some embodiments, the length of code stream may be predicted based on two or more coding tables illustrated in Table 2, and the minimum length of code stream may be obtained as the predicted length. In some embodiments, coding tables 0 through 5 may be applied for prediction. In some embodiments, coding tables 0 and 1 may be applied for prediction.

In some embodiments, run-length coding may be used as a candidate coding mode. In some embodiments, zero elements and non-zero elements may be expressed as a plurality of two-tuples. In some embodiments, a two-tuple may refer to a data set illustrating the number of consecutive zeros, and the non-zero element value. Merely by way of example, for a plurality of data (e.g., 0,2,3,0,0,0,5,0), four two-tuples may be obtained, that is, (1,2), (0,3), (3,5), (0,0). As another example, for a plurality of data (0,12,23,0,0,0, 5,0), four two-tuples may be obtained, that is, (1,12), (0,23), (3,5), (0,0). In some embodiments, a two-tuple may be expressed by a byte (i.e., 8 bits). In some embodiments, a non-zero element may have a value within the range 0 to 7 (i.e., a non-zero element may be expressed by 3 bits, and the remaining 5 bits may express the number of consecutive zeros). In some embodiments, if the number of consecutive zeros exceeds the upper limit of 5 bit unsigned integer, more than 5 bits may be used for expressing the number of consecutive zeros. For example, the two-tuples illustrating the number of consecutive zeros may be expressed as:

(31, 0), ···, (y, z), repeat x times wherein x and y may satisfy a mathematical relationship 31x+y=h, and h may refer to the number of consecutive zeros. It should be noted that the number 31 is merely for exemplary purposes, and should not be understood as the only embodiment. In some embodiments, a two-tuple may be expressed by two bytes (i.e., 16 bits), wherein one byte may express the number of consecutive zeros, while the other byte may express the non-zero element value. For example, a two-tuple (1,12) may be expressed as two bytes: 00000001 and 00001100. In some embodiments, for a third-level data set having many numbers of consecutive zeros, run-length coding may be more appropriate than Huffman coding.

In some embodiments, order-k exponential Golomb coding may be used as a candidate coding mode. In some embodiments, a code stream of order-k exponential Golomb coding may include a prefix binary string, and a suffix binary string. In some embodiments, for data x, the prefix binary string may include a plurality of consecutive bit 1 and one bit 0. In some embodiments, the number of bit 1 may be t(x) illustrated in equation (31). In some embodiments, the suffix binary string may include "k+t(x)" bits to express data $x+2^k(1-2^{t(x)})$. Merely by way of example, for data 5, order-0 exponential Golomb coding stream may be 11010.

In some embodiments, a histogram H may be determined based on the third-level data set. In some embodiments, the length of code stream may be predicted according to equation (32):

$$L = \sum_{x=0}^{X-1} H(x)(2 \times t(x) + k + 1), \qquad (32)$$

wherein L may represent the length of code stream, x may represent an element value of the third-level data set, "X−1" may represent the largest value of the third-level data set, k may refer to the order of Golomb coding, and t(x) may refer to a function of x. In some embodiments, "X−1" may be related to the bit depth of the third-level data set. In some embodiments, t(x) may be expressed as $t(x)=\lfloor \log_2(x/2^k+1) \rfloor$, wherein $\lfloor y \rfloor$ may refer to an integer no larger than y (y may be represented as $\log_2(x/2^k+1)$). In some embodiments, k may be 0.

At 1430, coding mode determination module 320 may determine whether to encode the third-level data set or not. In some embodiments, whether to encode the third-level data set or not may be determined based on the predicted length of code stream. In some embodiments, the predicted length determined at 1420 may be compared with the length of original code stream determined at 1410. In some embodiments, the comparison may be based on one or more mathematical relationships between the predicted length and the length of original code stream. For example, if the predicted length with candidate coding mode(s) is no less than the length of the original code stream, the third-level data set may be not encoded. On the other hand, if the predicted length with candidate coding mode(s) is less than that of the original code stream, the third-level data set may be encoded with the candidate coding mode(s). As another example, if the predicted length with a candidate coding mode is less than a threshold, the third-level data set may be encoded with the candidate coding mode. In some embodiments, the threshold may be related to the length of original code stream. Merely by way of example, the threshold may be equal to, larger than, or less than the length of original code stream. In some embodiments, the threshold and the length of original code stream may have a ratio equal to, larger than or less than 1.

If the third-level data set is determined not to be encoded, code stream generation module 330 at 1440 may generate the original code stream of the third-level data set. If the third-level data set is determined to be encoded, the coding mode for third-level data set may be determined at 1450 based on the predicted length. In some embodiments, a (predicted) shortest length of the code stream for two or more candidate coding modes may be determined, and the corresponding coding mode may be determined. Merely by way of example, if the predicted length with run-length coding is less than those with order-k exponential Golomb coding and fixed-length coding, run-length coding may be determined (or selected) as the coding mode for encoding the third-level data set. As another example, if the predicted length with order-k exponential Golomb coding is less than those with run-length coding and fixed-length coding, order-k exponential Golomb coding may be determined (or selected) as the coding mode for encoding the third-level data set. In some embodiments, if the predicted length(s) with run-length coding and/or order-k exponential Golomb coding may be no less than the length of original code stream, fixed-length coding may be determined(or selected) as the coding mode for encoding the third-level data set. In some embodiments, if only one coding mode is used as candidate coding mode at 1420, the coding mode may be determined and step 1450 may be skipped.

At 1460, code stream generation module 330 may generate one or more code streams of the third-level data set based on the coding mode determined at 1450. In some embodiments, the code stream generated at 1460 or the original code stream generated at 1440 may be stored in a local storage or storage 130 (via network 150).

Referring back to FIG. 11, at 1140, packaging module 340 may package the generated code stream(s). In some embodiments, the code stream(s) and/or header(s) may be packaged based on an exemplary process 1500 shown in FIG. 15.

At 1510, packaging module 340 may generate a header. In some embodiments, packaging module 340 may generated a header for a third-level data set. In some embodiments, a plurality of third-level data sets may be derived from one or more second-level data sets, which may be derived from a first-level data set. In some embodiments, a header corresponding to the first-level data set may be generated. In some embodiments, a header may include information regarding the coding mode of the code stream(s) to be packaged, the length of the code stream(s), whether the code stream(s) is encoded or not, one or more pixel values, or the like, or any combination thereof. In some embodiments, the length of the code stream(s) indicated in a header may refer to the sum of the lengths of the code streams to be packaged for a plurality of third-level data sets. In some embodiments, a header may have one or more bytes to store the information illustrated above.

FIG. 16-A is a schematic diagram of an exemplary header for 3 layer images ($L_0$, $L_1$, $L_2$) of a YCbCr 4:2:0 image. The header may have 5 bytes (i.e., byte 0, byte 1, byte 2, byte 3, and byte 4). In some embodiments, the 7th bit 1601 of byte 0 may indicate whether the code stream(s) have been encoded or not. The 0th bit through 5th bit 1602 in byte 0 may indicate the length of code stream for layer image $L_0$. The 0th bit through 5th bit 1603 in byte 1 may indicate the length of code stream for layer image $L_1$. The 0th bit through 5th bit 1604 in byte 2 may indicate the length of code stream for layer image $L_2$. The 6th bit through 7th bit 1605 in byte 3 may indicate the coding mode for layer image $L_2$. The 3rd bit through 5th bit 1606 in byte 3 may indicate the coding mode for layer image $L_1$. The 0th bit through second bit 1607 in byte 3 may indicate the coding mode for layer image $L_0$. For image layer $L_0$ and/or $L_1$, if Huffman coding has been applied, binary data with 3 bits may represent a coding table in Table 1. For example, 000 may represent coding table 0, 001 may represent coding table 1, 010 may represent coding table 2, 011 may represent coding table 3, 100 may represent coding table 4, and 101 may represent coding table 5. In some embodiments, 110 may represent run-length coding, and 111 may represent non-coding. For image layer $L_2$, if Huffman coding has been applied, binary data with 2 bits may represent a coding table in Table 1. For example, 00 may represent coding table 0, and 01 may represent coding table 1. In some embodiments, 10 may represent rim-length coding, and 11 may represent non-coding. In some embodiments, the 0th bit through 7th bit 1608 in byte 4 may indicate the seed element value in the second-level data set Y.

FIG. 16-B is a schematic diagram of an exemplary header for 3 layer images ($L_0$, $L_1$, $L_2$) of a YCbCr 4:2:2 image. The header may have 4 bytes (i.e., byte 0, byte 1, byte 2, and byte 3). In some embodiments, the 7th bit 1611 of byte 0 may indicate whether the code stream(s) have been encoded or not. The second bit through 6th bit 1612 in byte 0 may indicate the length of code stream for layer image $L_0$. The 0th bit through 1th bit 1613 in byte 0 and the 5th bit through 7th bit 1614 in byte 1 may indicate the length of code stream for layer image $L_1$. The 0th bit through 4th bit 1615 in byte 1 may indicate the length of code stream for layer image $L_2$. The 6th bit through 7th bit 1616 in byte 2 may indicate the coding mode for layer image $L_2$. The 3rd bit through 5th bit 1617 in byte 2 may indicate the coding mode for layer image $L_1$. The 0th bit through second bit 1618 in byte 2 may indicate the coding mode for layer image $L_0$. In some embodiments, the 0th bit through 7th bit 1619 in byte 3 may indicate the seed element value in the second-level data set Y.

FIG. 17-A is a schematic diagram of an exemplary header for 3 layer images ($L_0$, $L_1$, $L_2$) of a Bayer color filter array image. In some embodiments, layer image $L_0$ may include a first portion (i.e., a third-level data set generated from the first second-level data set), and a second portion (i.e., a third-level data set generated from the second second-level data set). In some embodiments, the header may have 6 bytes (i.e., byte 0, byte 1, byte 2, byte 3, byte 4, and byte 5). Byte 0 may indicate information regarding the first portion of layer image $L_0$. Byte 1 may indicate information regarding the second portion of layer image $L_0$. Byte 2 may indicate information regarding the first portion of layer image $L_1$. Byte 3 may indicate information regarding the second portion of layer image $L_1$. Byte 4 may indicate information regarding the first portion of layer image $L_2$. Byte 5 may indicate information regarding the second portion of layer image $L_2$. In some embodiments, the 7th bit 1701 of byte 0 may indicate the coding mode for the first portion of layer image $L_0$. For example, value "0" at 7th bit may indicate run-length coding, while value "1" at 7th bit may indicate order-k exponential Golomb coding. The 0th bit through 6th bit 1702 of byte 0 may indicate the length of code stream for the first portion of layer image $L_0$. In some embodiments, the length of code stream may refer to the number of bytes of the code stream. It should be noted that byte 1 through byte 5 may be illustrated in a similar manner.

Referring back to FIG. 15, at 1520, packaging module 340 may package the header generated at 1510, and one or more code streams generated at 1440 or 1460. In some embodiments, the code stream(s) of one or more layer images may be arranged in a certain order. In some embodiments, the header and code stream(s) may be arranged in a certain order. In some embodiments, packaging module 340 may generate a packaged code stream. FIG. 17-B is a schematic diagram of an exemplary packaged code stream 1710, which includes code streams for 3 layer images ($L_0$, $L_1$, $L_2$) of a Bayer color filter array image. The packaged code stream may include a code stream 1713 for layer image $L_0$, a code stream 1714 for layer image $L_1$, and a code stream 1715 for layer image $L_2$. The packaged code stream may also include a direct component for green chroma (DCGC) 1711, a direct component for red/blue chroma (DCRC/DCBC) 1712. In some embodiments, DCGC may have 2 bytes. In some embodiments, DCRC/DCBC may have 2 bytes. The packaged code stream may further include a header 1716. The header 1716 may be located at the head of the packaged code stream, the end of the packaged code stream, or any other location within the packaged code stream.

Figure 18:
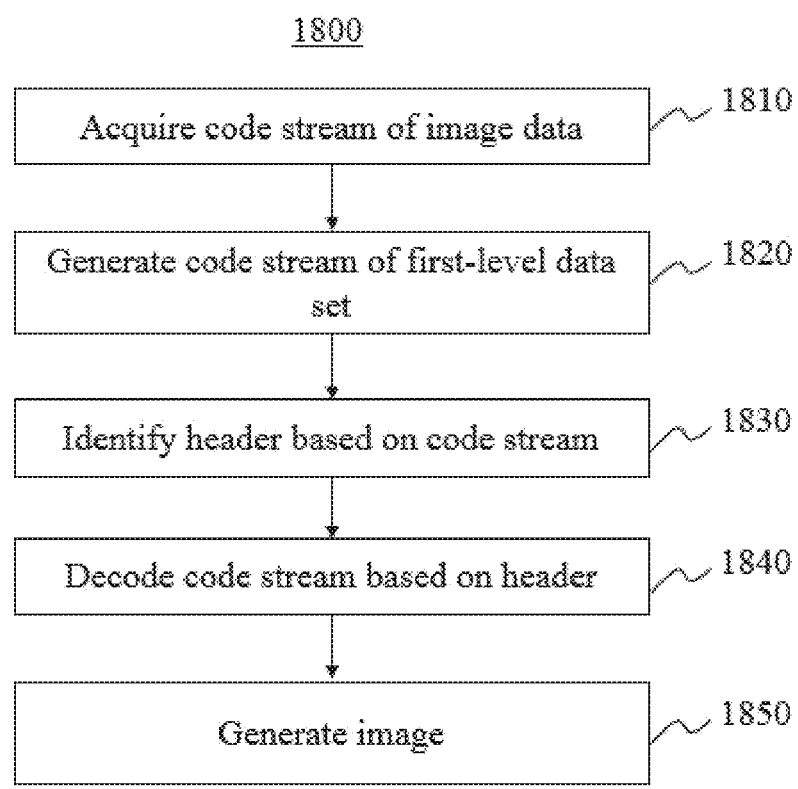
FIG. 18 is a flowchart of an exemplary process for decoding an image according to some embodiments of the present disclosure.

In some embodiments, an image may be decoded based on an exemplary process 1800 shown in FIG. 18. At 1810, code stream determination module 510 may acquire a code stream of an image. In some embodiments, the code stream may be acquired from a local storage or storage 130 (via network 150).

At 1820, code stream determination module 510 may generate a code stream of a first-level data set based on the acquired code stream. In some embodiments, code stream determination module 510 may modify the code stream acquired at 1810, or extract one or more codes from the code stream acquired at 1810. In some embodiments, code stream determination module 510 may generate a plurality of sub-code streams based on the code stream acquired at 1810. In some embodiments, the generated sub-code streams may be processed at 1830 and/or at 1840.

At 1830, header identification module 520 may identify a header based on code stream of the first-level data set generated at 1820. In some embodiments, the header may be identified according to the location of the header in the code stream. Header identification module 520 may identify information regarding the coding mode of code stream(s), the length of code stream(s), whether the code stream(s) is encoded or not, one or more pixel values, or the like, or any combination thereof.

At 1840, decoding module 530 may decode the code stream of the first-level data set generated at 1820. In some embodiments, decoding module 530 may decode the code stream based on the coding mode(s) determined at 1830. In some embodiments, the code streams of a plurality of first-level data sets may be generated. In some embodiments, decoding module 530 may decode one or more of the code streams in order. In some embodiments, decoding module 530 may randomly decode a code stream of a first-level data set. In some embodiments, decoding module 530 may generate a plurality of target image data after decoding, based on the code stream(s) of the first-level data set(s) generated at 1820.

In some embodiments, image data corresponding to the code stream(s) decoded at 1840 may be reconstructed based on an exemplary process 1900 shown in FIG. 19-A. At 1901, one or more third-level data sets may be reconstructed. In some embodiments, decoding module 530 may determine a specific code stream for a layer image $L_x$ (x may be an integer, 0≤x≤N−1) from the code stream generated at 1820. In some embodiments, the specific code stream may be determined based on the header identified at 1830. For example, the specific code stream for layer image $L_2$ may be determined by interpreting the length $l_0$ of code stream for layer image $L_0$, the length $l_1$ of code stream for layer image $L_1$, and the length $l_2$ of code stream for layer image $L_2$. The specific code stream for layer image $L_2$ may start at the bit position of $l_0+l_1$, and end at the bit position of $l_0+l_1+l_2$. In some embodiments, whether the specific code stream have been encoded may be determined based on the header. If the specific code stream has not been encoded, it may be regarded as the original code stream of a third-level data set. If the specific code stream have been encoded, it may be decoded according to the coding mode stored in the header. In some embodiments, decoding may be an inverse process of the coding mode (e.g., Huffman coding, run-length coding, order-k exponential Golomb coding, or fixed-length encoding, or the like, or any combination thereof). After decoding, a third-level data set may be obtained.

At 1902, for a YCbCr image, decoding module 530 may reconstruct a residual image based on a plurality of third-level data sets reconstructed at 1901. In some embodiments, the residual value of a pixel in the residual image may be obtained through a weighted sum of the values of the same pixel in different layer images. An exemplary residual value may be determined according to equation (33):

$$e(m, n) = \sum_{x=0}^{N-1} W_x L_x(m, n), \qquad (33)$$

wherein $W_x$ may represent a weight for layer image $L_x$. In some embodiments, the weights for layer images ($L_0$, $L_1$, $L_2$) may be 1, 8, and 64 respectively.

In some embodiments, the residual values of the residual image may be inversely mapped according to equation (34):

$$e' = \begin{cases} e/2 & e \text{ is even} \\ -(e+1)/2 & e \text{ is odd} \end{cases}. \qquad (34)$$

In some embodiments, the residual values may be rearranged, and a residual image may be reconstructed.

At 1903, decoding module 530 may reconstruct a plurality of second-level data sets based on the residual image reconstructed at 1902. In some embodiments, for a YCbCr image, the second-level data sets reconstructed may include a second-level data set Y, a second-level data set Cb, and a second-level data set Cr. In some embodiments, the second-level data set Y may be reconstructed according to equations (5) through (7), and the seed element value identified in the header. In some embodiments, the second-level data set Cb may be reconstructed according to equations (8) through (11) and the seed element value identified in the header. In some embodiments, the second-level data set Cr may be reconstructed according to equation (8) through (11), and a fixed value $V_F$.

At 1904, decoding module 530 may reconstruct a first-level data set based on the second-level data sets reconstructed at 1903. For a YCbCr image, the luma component value of a pixel may be obtained from the second-level data set Y, the blue-difference chroma component value of the same pixel may be obtained from the second-level data set Cb, and the red-difference chroma component value of the same pixel may be obtained from the second-level data set Cr. Then the luma component value, the blue-difference chroma component value, and the red-difference chroma component value may form a pixel value. The pixel value may be an element of the first-level data set. An element of the first-level data set may refer to a pixel of the image data. As such, a plurality of elements may be obtained, and a first-level data set may be reconstructed. In some embodiments, a plurality of first-level data sets may be reconstructed in the similar way.

In some embodiments, image data corresponding to the code stream(s) decoded at 1840 may be reconstructed based on another exemplary process 1910 shown in FIG. 19-B. At 1911, one or more third-level data sets may be reconstructed. The reconstruction process for third-level data set at 1911 may be similar with that at 1901.

At 1912, for a color filter array image, decoding module 530 may reconstruct a plurality of second-level data sets based on the first-level data sets reconstructed at 1911. In some embodiments, a first second-level data set may be reconstructed based on a plurality of third-level data sets. An element value of the first second-level data set may be reconstructed through a weighted sum of the corresponding elements in the third-level data sets. In some embodiments, the element value may be determined according to equation (33). In some embodiments, a second second-level data set may be reconstructed based on a plurality of third-level data sets in the same way.

At 1913, decoding module 530 may reconstruct a first-level data set based on the first second-level data set and the second second-level data set reconstructed at 1912. In some embodiments, the elements of the first second-level data set and the second second-level data set may be inversely mapped according to equation (34). An inverse quantization process may be performed for the first second-level data set according to equation (21), followed by an inverse 2D DCT process according to equations (22) through (25). In some embodiments, according to equation (26), the inversely processed first second-level data set may be added with the second second-level data set, and a first-level data set may be reconstructed. In some embodiments, an element of the first-level data set may refer to a pixel of the image data corresponding to the code stream(s) decoded at 1840. In some embodiments, for a Bayer color filter array image, the first-level data set may include a first chroma component data set, and a second chroma component data set. The image data corresponding to the code streams) decoded at 1840 may be determined according to the color filter array pattern. For example, the first chroma component data and the second chroma component data may be alternately arranged in a column or row of the image data matrix.

Referring back to FIG. 18, at 1850, image reconstruction module 540 may reconstruct age or a portion thereof. In some embodiments, an image or a portion of the image may be reconstructed based on target image data generated at 1840. In some embodiments, image reconstruction module 540 may determine the pixel positions of the target image data. In some embodiments, pixel positions may be determined based on other code streams acquired at 1810. For example, image reconstruction module 540 may interpret headers of other code streams, obtain the length of other code streams, and determine the pixel positions of the target image data based on the length of other code streams.

Figure 20:
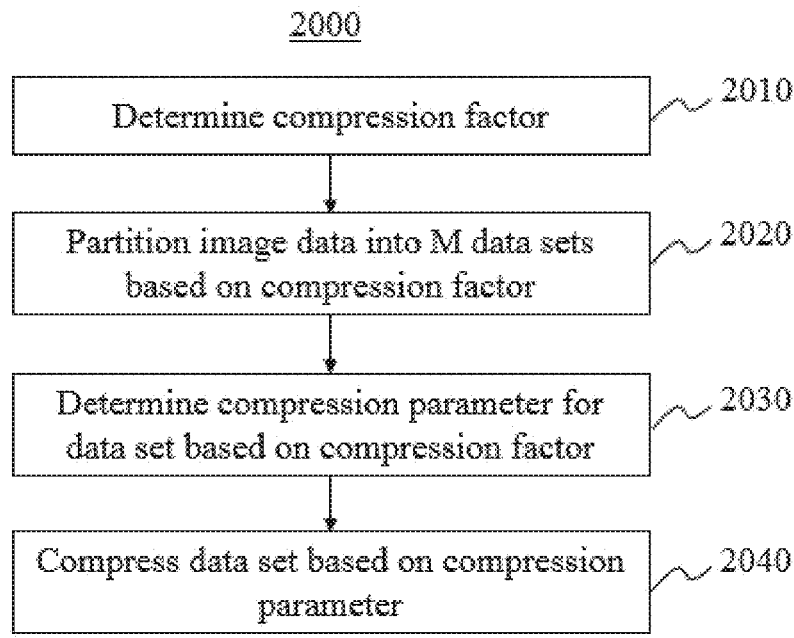
FIG. 20 is a flowchart of an exemplary process of scaling an image according to some embodiments of the present disclosure.

Referring FIG. 20, the process of image scaling may include determining compression factor, partitioning image data into M data sets based on compression factor, determining compression parameter for a data set based on compression factor, and compressing data set based on compression parameter.

At 2010, compression factor determination module 710 may determine compression factor(s). In some embodiments, the compression factor may be a compression ratio and/or a number of tap(s) of a filter, or any combination thereof. The compression ratio may be used in compressing image data in horizontal or vertical direction. The compression ratio may be determined by a system default or self-defined by a user. In some embodiments, the compression ratio may be 1.2, 1.5, 2, 3, or 4, or the like, or any other real number.

In some embodiments, the number of tap(s) of a filter is set by the system. The number of tap(s) of a filter may be determined by a system default or defined (or adjusted) by a user. The number of tap(s) of a filter may be determined based on image compression effect. The compression effect may be determined by the compression ratio for the image data. For example, if the compression ratio is 4, the optimal number of taps of a filter may be equal or greater than 6; if the number of tap(s) of a filter is less than 6, the compression effect may be deceased. In some embodiments, the compression factor determined by step 2010 may be used for steps 2020, 2330, and/or 2040, or any combination thereof. In some embodiments the compression factor may be acquired from image capture device 120, display device 140, a local storage, or a storage 130 (via network 150), or other device capable of generating data, or the like, or any combination thereof.

At 2020, partition module 720 may determine M image data sets. M image data sets may be determined based on the compression ratio and the number of tap(s) of a filter. An image data set may contain K columns (or rows). An image data set may be compressed into a single column (or row). In some embodiments, M may be denoted as the number of columns (or rows) for the compressed image data. An image data set may include K reference columns (or rows). The K reference columns (or rows) may be compressed into a single column (or row). In some embodiment, the reference columns (or rows) in the image data set may be equal to the number of tap(s) of a filter. In some embodiments, the number of the reference columns (or rows) corresponding to several head columns (or rows) of image data or several end columns (or rows) may be less than the number of tap(s) of a filter. For example, for the first compressed row in the compressed image data, when the number of taps of a filter is 6, the reference rows may include the first row and the second row in the image data.

For example, the number of taps of a filter may be 6. If the compression ratio is used in compressing image data in horizontal direction, the image data set may include K reference rows, wherein. K may be equal to the number of tap(s) of a filter. If the compression ratio is used in compressing image data in vertical direction, the image data set may include K reference columns, wherein K may be equal to the number of tap(s) of a filter. In some embodiments, if the compression ratio is used in compressing image data in horizontal direction, the image data set of the first few rows may include K reference rows, wherein K may be less than the number of tap(s) of a filter. If the compression ratio is used in compressing image data in vertical direction, the image data set of the first columns may include K reference columns, wherein K may be less than the number of tap(s) of a filter.

In some embodiments, an image data set may be compressed into a single row or a single column in the compressed image data. The compressed image data may include one or more compressed rows or compressed columns. In some embodiments, the compressed row may be compressed by the data set with K reference rows, and the compressed column may be compressed by the data set with K reference columns. In some embodiments, compressed row i may be derived from specific rows in the image data, and compressed column i may be derived from specific columns in the image data. In some embodiments, a specific row k in the image data may be determined as equation (3).

For example, when the number of taps of a filter equals to 6, the reference rows in the image data to the compressed row i may include row k−2, row k−1, row k, row k+1, row and row In some embodiments, the M image data sets partitioned at 2020 gray be used for steps 2330 or 2040, or both.

At 2030, compression parameter determination module 730 may determine compression parameter(s). In some embodiments, the compression parameter may be determined based on compression parameter group(s). The compression parameter group(s) may be determined according to compression table(s).

Figure 21:
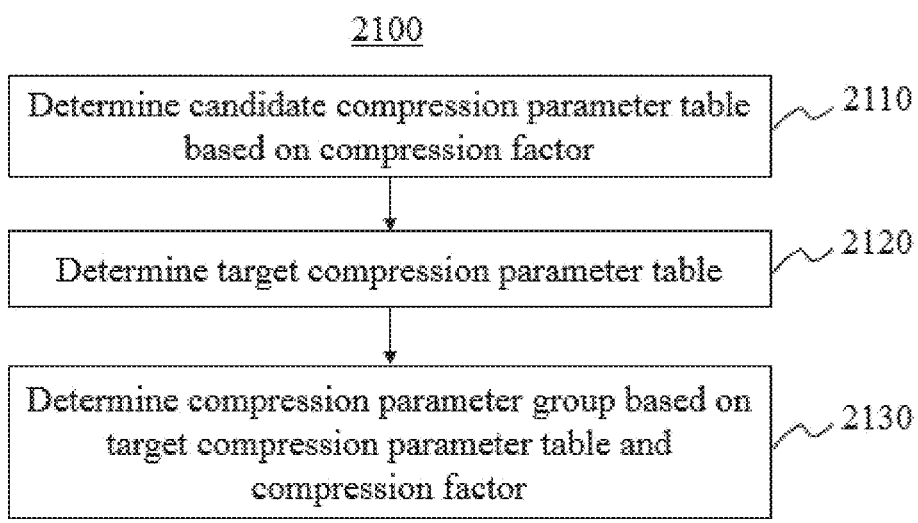
FIG. 21 is a flowchart of an exemplary process of determining a compression parameter according to some embodiments of the present disclosure.

In some embodiments, compression parameter(s) may be determined based on an exemplary process 2100 shown in FIG. 21. At 2110, candidate compression parameter table may be determined. For example, when the compression ratio acquired is 1.2, 1.5, 2, 3, or 4, a preset compression parameter table corresponding to the compression ratio acquired is determined. If the compression ratio acquired is different from the preset compression parameter table, a candidate compression parameter table is determined based on the compression factor. For example, a first compression ratio and a second compression ratio is selected from the compression ratio preset. The first compression ratio may be closest to the compression ratio acquired, but less than the compression ratio acquired. The second compression ratio may be closest to the compression ratio acquired, but greater than the compression ratio acquired. A first compression parameter table and a second compression parameter table may be determined as candidate compression parameter tables, based on the first compression ratio and the second compression ratio respectively.

At step 2120, target compression parameter table may be determined. A third compression parameter table may be determined based on the first candidate compression parameter table and the second candidate compression parameter table. The third compression parameter table may be calculated as follows:

$$P_{zm}(k)=P_{zs}(k)\times W_{zs}+P_{zl}(k)\times W_{zl}, \quad (35)$$

wherein $P_{zm}(k)$ may be a compression parameter k in the third compression parameter table, $P_{zs}(k)$ may be a compression parameter k in the first candidate compression parameter table, $P_{zl}(k)$ may be a compression parameter k in the second candidate compression parameter table, and $W_{zs}$ and $W_{zl}$ may be weight factors.

When the compression ratio is zm, if zm is different from the preset compression ratio, the third compression parameter table may be calculated through operations below:

1) A key compression ratio zs and a key compression ratio zl may be determined. The key compression ratio zs may be the biggest compression ratio less than zm. The key compression ratio zl may be the least compression ratio greater than zm;

2) If zm/zs≤1.2, the compression parameter table corresponding to zm may be used as the third compression parameter table directly; and 3) If zm/zs>1.2, the third compression parameter table may be determined by weighted summation of the compression parameter tables corresponding to zs and zl.

In some embodiments, the weight factor of zs may be shown as follows:

$$W_{zs}=\log_2 \alpha\times((ZL-1.2\times ZS)/(Zm-1.2\times ZS)). \quad (36)$$

In some embodiments, the weight factor of zl may be shown as follows:

$$W_{zl}=1-\log_2 \alpha\times((ZL-1.2\times ZS)/(Zm-1.2\times ZS)), \quad (37)$$

wherein α may be a configurable parameter greater than 0. The default value of α may be equal to 1. An increase of a may decrease pseudomorphism. A reduction of α may increase sharpness.

4) The third compression parameter table may be determined by equation (35) based on the first compression parameter table and the second compression parameter table.

In some embodiments, considering the actual numerical value in target compression parameter table may be double type, and may be a decimal less than 1, the target compression parameter table may be further processed by operations including parameter definite programming, direct current (DC) correction, or phase correction. The parameter definite programming may include several operations. For example, the parameter in the target compression parameter may be added as W-all. The parameter may be multiplied by 256/W-all. The parameter may be rounding off to an integer. After the processing, the processed parameter may be an integer less than 256, and the summation of all parameters in the target compression parameter table may be close to 256. If a summation of all parameters in the target compression parameter table equals to 256, the parameter may need no direct current (DC) correction, or phase correction. If a summation of all parameters in the target compression parameter table does not equal to 256, parameters in the target compression parameter table may be added as Wm-all, and the biggest parameter Wmax may be modified as $W_{max}-(\Sigma W_m-256)$.

At 2130, compression parameter group may be determined, based on the target compression parameter table and the compression factor. If row i in the compressed image data satisfies the first expression, the first compression parameter group in the target compression parameter table may be selected as a compression parameter group corresponding to the image data set. If row i in the compressed image data satisfies the second expression, the last compression parameter group in the target compression parameter table may be selected as a compression parameter group corresponding to the image data set. If row i in the compressed image data satisfies the third expression, a compression parameter group S and a compression parameter group S+1 may be determined as follows:

$$s=\lfloor(i\times\lambda-\lfloor i\times\lambda\rfloor)\times N+\theta\rfloor. \quad (38)$$

According to the equation (42), the compression parameter group S and S+1 may be used in a weighted calculation, and a corresponding compression parameter group may be generated.

The first expression may be shown as follows:

$$(i\times\lambda-\lfloor i\times\lambda\rfloor)\times N\leq\theta. \quad (39)$$

The second expression may be shown as follows:

$$(i\times\lambda-\lfloor i\times\lambda\rfloor)\times N\geq N-\theta. \quad (40)$$

The third expression may be shown as follows:

$$N-\theta<(i\times\lambda-\lfloor i\times\lambda\rfloor)\times N<\theta. \quad (41)$$

The first formula may be shown as follows:

$$W(j)=W_s(j)\times WP_s+W_{s+1}(j)\times WP_{s+1}, \quad (42)$$

wherein λ may be a compression ratio in the first expression, the second expression, and the third expression. θ may be a preset value, 0<θ<1. The operator ⌊ ⌋ may represent rounding down. W(j) in equation (42) may refer to the jth compression parameter in the target compression parameter table. j may be an integer no greater than M. $W_S(j)$ and $W_{S+1}(j)$, which may refer to the jth compression parameter in the compression parameter group S and compression parameter group S+1, respectively. $WP_S$ and $WP_{S+1}$ may refer to weighted factors of the compression parameter in the compression parameter group S and compression parameter group S+1, respectively. $WP_S$ may be determined as follows:

$$WP_s = 1-((i\times\lambda - \lfloor i\times\lambda \rfloor)\times N - \theta) + s. \tag{43}$$

$WP_{s+1}$ may be determined as follows:

$$WP_{s+1} = (i\times\lambda \lfloor i\times\lambda \rfloor)\times N - \theta - s. \tag{44}$$

Figure 22:
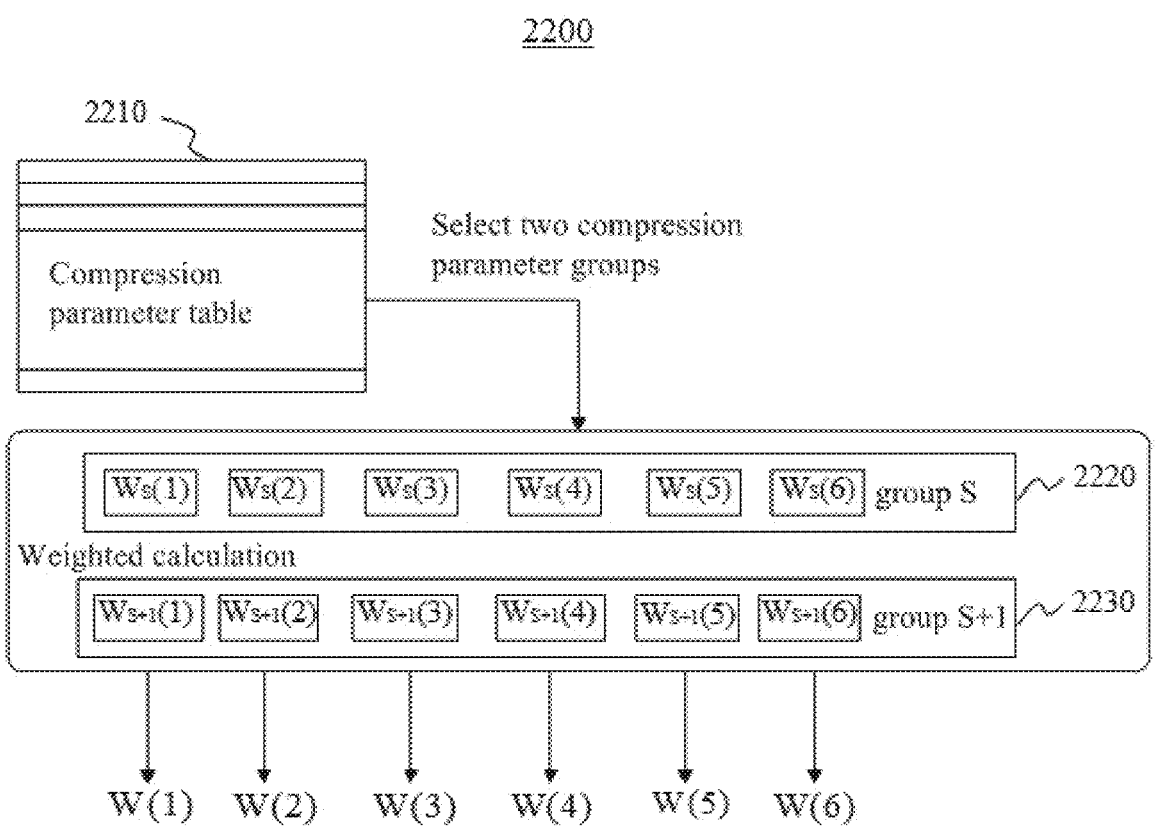
FIG. 22 is a schematic diagram illustrating an exemplary method for determining a target compression parameter group according to some embodiments of the present disclosure.

FIG. 22 is a schematic diagram illustrating an exemplary method for determining a target compression parameter group according to some embodiments of the present disclosure. Two candidate compression parameter groups (e.g., compression parameter group S 2220, and compression parameter group S+1 2230) may be selected from the target compression parameter table 2210. The target compression parameter table 2210 may include 32 compression parameter groups. The two candidate compression parameter groups selected may include a first candidate compression parameter group (e.g., compression parameter group S 2220) and a second candidate compression parameter group (e.g., compression parameter group S+1 2230). If row i in the compressed image data satisfies the relationship (39), the first compression parameter group in the target compression parameter table 2210 may be selected as the target compression parameter group corresponding to the image data set. If row i in the image data compressed satisfies the relationship (40), the last compression parameter group in the target compression parameter table 2210 may be selected as the target compression parameter group corresponding to the image data set. If row i in the image data compressed satisfies the relationship (41), a compression parameter group S 2220 and a compression parameter group S+1 2230 may be determined.

In some embodiments, the compression parameter groups S 2220 and S+1 2230 may be used in a weighted calculation according to equation (42), and a target compression parameter group may be generated. The compression parameter group S 2220 may include 6 compression parameters $W_S(1)$, $W_S(2)$, $W_S(3)$, $W_S(4)$, $W_S(5)$, and $W_S(6)$. The compression parameter group S+1 2230 may include 6 compression parameters $W_{S+1}(1)$, $W_{S+1}(2)$, $W_{S+1}(3)$, $W_{S+1}(4)$, $W_{S+1}(5)$, and $W_{S+1}(6)$. These 12 compression parameters may be used to generate a target compression parameter group including $W(1)$, $W(2)$, $W(3)$, $W(4)$, $W(5)$, and $W(6)$, based on equation (42). For example, $W(2)$ may be calculated as follows:

$$W(2) = W_s(2)\times WP_s + W_{s+1}(2)\times WP_{s+1}. \tag{45}$$

In some embodiments, the target compression parameter group with compression parameters including $W(1)$, $W(2)$, $W(3)$, $W(4)$, $W(5)$, $W(6)$ may be used to compress an image data set by compression module 740. In some embodiments, compression parameters may be obtained by image processing system 110 without using equations above. For example, compression parameters may be determined according to one or more data sheets storing the relationship between the compression factor(s) and the compression parameters.

Referring back to FIG. 21, in some embodiments, steps 2110, 2120, 2130, and/or 2140 may be implemented by image scaling engine 250. In some embodiments, compression parameter table, compression parameter group, or compression parameter may be determined directly by the system. In some embodiments, one or more steps may not be necessary.

Referring back to FIG. 20, at 2040, compressing module 740 may compress the M image data sets determined at 2030. In some embodiments, the M image data sets may be compressed based on corresponding compression parameters. For example, when the number of taps of a filter is 6, 6 reference rows may be compressed into a single row The 6 reference rows may include row k−2, row k−1, row k, row k+1, row k+2, and row k+3. A pixel value in row i may be calculated as follows:

$$LNew_i(x) = \sum_{\substack{i=1 \\ j=k-2}}^{\substack{i=6 \\ j=k+3}} W_i \times L_j(x), \tag{46}$$

wherein $L_{k-2}(x)$, $L_{k-1}(x)$, $L_k(x)$, $L_{k+1}(x)$, $L_{k+2}(x)$, and $L_{k+3}(x)$ may be an R/G/B component of a pixel in vertical coordination x. $L_{New_i}(x)$ may be a specific pixel value in row i of compressed image data. $W_i$ may be a weight factor for reference row(s) in the image date set. $W_i$ may be different according to different compressed row(s). $W_i$ may be the same for different pixel X in vertical coordinate according to the same row(s).

In some embodiments, pixel value in vertical coordinate 10 in row i of compressed image data may be calculated as follows:

$$LNew_i(10) = \sum_{\substack{i=1 \\ j=k-2}}^{\substack{i=6 \\ j=k+3}} W_i \times L_j(10), \tag{47}$$

wherein k may be a number of taps of a filter, and k may be greater than the largest compression ratio. Although grater k may generate compression effect, the cost of the hardware may limit the range of k. Generally, according to the biggest compression ratio preset in the system, the filter with 6 taps (i.e., k may be 6) may be selected to compress the image data. If k is less than 6, the compression may be decreased. Generally, the determination for k may be a balance between computation cost and effect of compression.

Referring FIG. 23-A, the block diagram may include a compression parameter table 2301, a compression parameter group S 2302, and a compression parameter group S±1 2303, an RGB of pixel in vertical coordination x in row k−2 2304, an RGB of pixel in vertical coordination x in row k−1 2305, an RGB of pixel in vertical coordination x in row k 2306, an RGB of pixel in vertical coordination x in row k+1 2307, an RGB of pixel in vertical coordination x in row k+2 2308, and an RGB of pixel in vertical coordination x in row k+3 2309.

In some embodiments, two candidate compression parameter groups may be selected from the target compression parameter table in compression parameter table 2301. The two candidate compression parameter groups may include a compression parameter group S 2302 and a compression parameter group S+1 2303. For example, if row i in the image data compressed satisfies the relationship (39), the first compression parameter group in the target compression parameter table may be selected as the target compression parameter group corresponding to the image data set. If row i in the image data compressed satisfies the relationship (40), the last compression parameter group in the target compression parameter table may be selected as the target compression parameter group corresponding to the image data set. If row i in the image data compressed satisfies the relationship (41), compression parameter group S 2302 and compression parameter group S+1 2303 may be determined (or selected) as candidate compression parameter groups.

Compression parameter group S 2302 may include 6 compression parameters $W_S(1)$, $W_S(2)$, $W_S(3)$, $W_S(4)$, $W_S(5)$, and $W_S(6)$. Compression parameter group S+1 2303 may include 6 compression parameters $W_{S+1}(1)$, $W_{S+1}(2)$, $W_{S+1}(3)$, $W_{S+1}(4)$, $W_{S+1}(5)$, and $W_{S+1}(6)$. These 12 compression parameters may generate a compression parameter group $W(1)$, $W(2)$, $W(3)$, $W(4)$, $W(5)$, and $W(6)$, based on equation (42). Six reference rows may respectively be RGB of pixel in vertical coordination x in row k−2 2304, RGB of pixel in vertical coordination x in row k−1 2305, RGB of pixel in vertical coordination x in row k 2306, RGB of pixel in vertical coordination x in row k+1 2307, RGB of pixel in vertical coordination x in row k+2 2308, and RGB of pixel in vertical coordination x in row k±3 2309. RGB of new pixel in vertical coordination x may be generated based on equation (47).

Referring FIG. 23-B, the block diagram may include a compression parameter table 2311, a compression parameter group S 2312, and a compression parameter group S+1 2313, an RGB of pixel in horizontal coordination x in column k−2 2314, an RGB of pixel in horizontal coordination x in column k−1 2315, an RGB of pixel in horizontal coordination x in column k 2316, an RGB of pixel in horizontal coordination x in column k+1 2317, an RGB of pixel in horizontal coordination x in column.k+2 2318, and an RGB of pixel in horizontal coordination x in column k+3 2319. New RGB of pixel(x) in horizontal coordination x may be output.

In some embodiments, two candidate compression parameter groups may be selected from the target compression parameter table in compression parameter table 2311. The two candidate compression parameter groups may include compression parameter group S 2312, and compression parameter group S+1 2313. For example, if column i in the image data compressed satisfies the relationship (39), the first compression parameter group in the target compression parameter table may be selected as the target compression parameter group corresponding to the image data set. If column i in the image data compressed satisfies the relationship (40), the last compression parameter group in the target compression parameter table may be selected as the target compression parameter group corresponding to the image data set. If column i in the image data compressed satisfies the relationship (41), compression parameter group S 2312 and compression parameter group S+1 2313 may be determined (or selected) as candidate compression parameter groups.

Compression parameter group S 2312 may include 6 compression parameters $W_S(1)$, $W_S(2)$, $W_S(3)$, $W_S(4)$, $W_S(5)$, and $W_S(6)$. Compression parameter group S+1 2313 may include 6 compression parameters $W_{S+1}(1)$, $W_{S+1}(2)$, $W_{S+1}(3)$, $W_{S+1}(4)$, $W_{S+1}(5)$, and $W_{S+1}(6)$. These 12 compression parameters may be used to generate a compression parameter group $W(1)$, $W(2)$, $W(3)$, $W(4)$, $W(5)$, and $W(6)$, based on equation (42).

Six reference columns may respectively be RGB of pixel in horizontal coordination x in column k−2 2314, RGB of pixel in horizontal coordination x in column k−1 2315. RGB of pixel in horizontal coordination x in column k 2316, RGB of pixel in horizontal coordination x in column k+1 2317, RGB of pixel in horizontal coordination x in column k+2 2318, and RGB of pixel in horizontal coordination x in column k+3 2319. RGB of new pixel in horizontal coordination x may be generated based on equation (47).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method implemented on at least one machine, each of which has at least one processor and storage device for encoding an image, the method comprising:
    acquiring image data of an image, the image being a color filter array image, the image including a matrix of pixels, the image data including pixel values of the matrix of pixels, each pixel of the matrix of pixels corresponding to a chroma component;
    encoding the image row by row, wherein the encoding of each row of the matrix of pixels includes:
        generating, based on a color filter array pattern of the each row of the matrix of pixels and chroma components of the pixels in the each row, a first-level data set corresponding to the each row;
        determining a first second-level data set based on the first-level data set, the first second-level data set representing coefficients of different direct component values corresponding to pixels of the each row;
        determining a second second-level data set based on the first second-level data set, an inverse quantization process, and an inverse 2D DCT process, the second second-level data set representing chroma component related residual values corresponding to the each row;
        determining a first third-level data set based on the first second-level data set;
        determining a second third-level data set based on the second second-level data set;
        determining a first coding mode for the first third-level data set by predicting lengths of code streams, with a first set of candidate coding modes, for the first third-level data set;
        determining a second coding mode for the second third-level data set by predicting lengths of code streams, with a second set of candidate coding modes, for the second third-level data set;
        encoding the first third-level data set and the second third-level data set into a code stream based on the first coding mode and the second coding mode; and
        packaging the code stream into a modified code stream corresponding to the each row.

2. The method of claim 1, the determining a first second-level data set based on the first-level data set comprising:
    generating at least one chroma component data set each of which corresponding to a same chroma component by extracting, based on the color filter array pattern of the each row, pixels corresponding to the same chroma component;
    generating a plurality of transformation coefficients by performing a two-dimensional discrete cosine transform (2D DCT) process and a quantization process on each of the at least one chroma component data set; and
    generating, based on the plurality of transformation coefficients, the first second-level data set.

3. The method of claim 2, generating at least one chroma component data set comprising:
    generating a first chroma component data set by extracting pixels at odd positions of the each row; and
    generating a second chroma component data set by extracting pixels at even positions of the each row.

4. The method of claim 1, the determining the second second-level data set based on the first second-level data set comprising:
    generating a reconstruction data set by performing the inverse quantization process and the inverse 2D DCT process on the first second-level data set;
    calculating the chroma component related residual values based on a difference between the pixels of the each row and the reconstruction data set; and
    generating the second second-level data set based on the chroma component related residual values corresponding to the each row.

5. The method of claim 1, further comprising:
    partitioning the first second-level data set into N1 third-level data sets that form the first third-level data set, N1 being a second integer, the second integer being greater than or equal to 1; and
    partitioning the second second-level data set into N2 third-level data sets that form the second third-level data set, N2 being a third integer, the third integer being greater than or equal to 1.

6. The method of claim 5, partitioning the first second-level data set into N1 third-level data sets comprising:
    partitioning each pixel value of the first second-level data into N1 portions, each portion of the N1 portions including one or more bits; and
    generating each third-level data set by extracting a portion of the N1 portions of the each pixel value.

7. The method of claim 5, partitioning the second second-level data set into N2 third-level data sets comprising:
    partitioning each pixel value of the second second-level data into N2 portions, each portion of the N2 portions including one or more bits; and
    generating each third-level data set by extracting a portion of the N2 portions of the each pixel value.

8. The method of claim 5, wherein the first second-level data set includes one or more component values of transformation coefficients, and the packaging the code stream into a modified code stream corresponding to the each row comprises:
generating a header, the header including a coding mode of each of the N1 third-level data sets, a length of a code stream of each of the N1 third-level data sets, a coding mode of each of the N2 third-level data sets, a length of a code stream of each of the N2 third-level data sets; and
packaging the header into the modified code stream, the modified code stream including the one or more component values of transformation coefficients.

9. The method of claim 5, wherein the first second-level data set includes one or more component values of transformation coefficients, and the partitioning the first second-level data set into N1 third-level data sets comprises:
extracting, from the first second-level data set, data excluding the one or more component values of transformation coefficients;
mapping the extracted data into non-negative integers;
partitioning each of the non-negative integers into N1 portions, each of the N1 portions including one or more bits; and
generating each third-level data set by extracting a portion of the N1 portions of the each non-negative integer.

10. The method of claim 1, determining the first coding mode for the first third-level data set by predicting lengths of code streams, with the first set of candidate coding modes, for the first third-level data set comprising:
for each first third-level data set,
predicting lengths of code streams of the first third-level data set with at least one of Huffman coding, run-length coding, fixed-length coding, or order-k exponential Golomb coding;
comparing the predicted lengths; and
selecting the first coding mode based on a result of the comparison.

11. The method of claim 10, determining the first coding mode for the first third-level data set by predicting lengths of code streams, with the first set of candidate coding modes, for the first third-level data set further comprising:
for the each first third-level data set,
calculating an original length of the code stream of the first third-level data set without coding;
comparing the predicted lengths with the original length; and
determining whether to encode the first third-level data set based on a result of the comparison.

12. The method of claim 11, determining whether to encode the first third-level data set comprising:
determine to encode the first third-level data set using the coding mode with the shortest length of the predicted lengths, if the predicted lengths are less than the original length; and
determine not to encode the first third-level data set, if any length of predicted lengths is not less than the original length.

13. The method of claim 1, wherein the each pixel of the matrix of pixels corresponds to only one chroma component of a red chroma component, a green chroma component, or a blue chroma component.

14. The method of claim 1, wherein each adjacent two pixels of the each row correspond to different chroma components.

15. The method of claim 1, wherein the image is a Bayer color filter array image.

16. The method of claim 1, determining the second coding mode for the second third-level data set by predicting lengths of code streams, with the second set of candidate coding modes, for the second third-level data set comprising:
for each second third-level data set,
predicting lengths of code streams of the second third-level data set with at least one of Huffman coding, run-length coding, fixed-length coding, or order-k exponential Golomb coding;
comparing the predicted lengths; and
selecting the second coding mode based on a result of the comparison.

17. A method implemented on at least one machine, each of which has at least one processor and storage device for decoding an image, the method comprising:
acquiring a code stream of image data corresponding to a color filter array image, the color filter array image including a matrix of pixels, the image data including pixel values of the matrix of pixels, each pixel of the matrix of pixels corresponding to a chroma component;
decoding the code stream row by row, including:
generating, based on the code stream, a plurality of sub-code streams, each sub-code stream corresponding to a row of the matrix of pixels;
for the each sub-code stream:
identifying, based on the each sub-code stream, a header;
decoding the each sub-code stream based on the header;
reconstructing a plurality of third-level data sets based on the decoded sub-code stream;
reconstructing a plurality of second-level data sets based on the plurality of third-level data sets, the plurality of second-level data sets include a first second-level data set and a second second-level data set, the first second-level data set representing coefficients of different direct component values corresponding to pixels of the row, the second second-level data set representing chroma component related residual values corresponding to the row;
reconstructing a first-level data set based on the plurality of second-level data sets, the first-level data set being associated with a color filter array pattern of the row of the matrix of pixels and chroma components of the pixels in the row; and
reconstructing the row of the image based on the first-level data set.

18. The method of claim 17, wherein the image is a Bayer color filter array image.

19. The method of claim 17, wherein the header includes at least one of Huffman coding mode, run-length coding mode, fixed-length coding mode, or order-k exponential Golomb coding mode.

20. A system comprising:
at least one storage including a set of instructions or programs; and
at least one processor configured to communicate with the at least one storage, wherein when executing the set of instructions or programs, the at least one processor is configured to cause the system to:
acquire a code stream of image data corresponding to a color filter array image, the color filter array image including a matrix of pixels, the image data including pixel values of the matrix of pixels, each pixel of the matrix of pixels corresponding to a chroma component;

decode the code stream row by row, the at least one processor is further configured to cause the system to:
- generate, based on the code stream, a plurality of sub-code streams, each sub-code stream corresponding to a row of the matrix of pixels;
- for the each sub-code stream:
    - identify, based on the each sub-code stream, a header;
    - decode the each sub-code stream based on the header;
    - reconstruct a plurality of third-level data sets based on the decoded sub-code stream;
    - reconstruct a plurality of second-level data sets based on the plurality of third-level data sets, the plurality of second-level data sets include a first second-level data set and a second second-level data set, the first second-level data set representing coefficients of different direct component values corresponding to pixels of the row, the second second-level data set representing chroma component related residual values corresponding to the row;
    - reconstruct a first-level data set based on the plurality of second-level data sets, the first-level data set being associated with a color filter array pattern of the row of the matrix of pixels and chroma components of the pixels in the row; and
    - reconstruct the row of the image based on the first-level data set.

\* \* \* \* \*